United States Patent
S V et al.

(10) Patent No.: US 9,563,977 B2
(45) Date of Patent: Feb. 7, 2017

(54) METHOD, APPARATUS AND COMPUTER PROGRAM PRODUCT FOR GENERATING ANIMATED IMAGES

(71) Applicant: Nokia Technologies Oy, Espoo (FI)

(72) Inventors: Basavaraja S V, Bangalore (IN); Veldandi Muninder, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 225 days.

(21) Appl. No.: 14/353,956

(22) PCT Filed: Oct. 31, 2012

(86) PCT No.: PCT/FI2012/051045
§ 371 (c)(1),
(2) Date: Apr. 24, 2014

(87) PCT Pub. No.: WO2013/079774
PCT Pub. Date: Jun. 6, 2013

(65) Prior Publication Data
US 2014/0292769 A1 Oct. 2, 2014

(30) Foreign Application Priority Data
Nov. 29, 2011 (IN) .......................... 4111/CHE/2011

(51) Int. Cl.
*G06T 13/80* (2011.01)
*G06T 3/40* (2006.01)
(Continued)

(52) U.S. Cl.
CPC ................. *G06T 13/80* (2013.01); *G06T 3/40* (2013.01); *G11B 27/034* (2013.01); *G11B 27/34* (2013.01)

(58) Field of Classification Search
None
See application file for complete search history.

(56) References Cited

U.S. PATENT DOCUMENTS

| 6,081,278 A | 6/2000 | Chen |
| 7,218,792 B2 | 5/2007 | Raskar et al. |

(Continued)

FOREIGN PATENT DOCUMENTS

| EP | 1 056 273 A2 | 11/2000 |
| GB | 2458636 A | 9/2009 |

OTHER PUBLICATIONS

International Search Report and Written Opinion received for corresponding Patent Cooperation Treaty Application No. PCT/FI2012/051045, dated Mar. 13, 2013, 14 pages.
(Continued)

*Primary Examiner* — James A Thompson
(74) *Attorney, Agent, or Firm* — Alston & Bird LLP

(57) ABSTRACT

In accordance with an example embodiment a method, apparatus and computer program product are provided. The method comprises facilitating a selection of a portion in at least one multimedia frame among a plurality of multimedia frames having a first resolution. The plurality of multimedia frames are partitioned into static layers and dynamic layers based on the selection of the portion. An animated image effect is configured from the dynamic layers of the plurality of multimedia frames. The method further includes performing generation of at least one dynamic frame having a second resolution from the dynamic layers, and, at least one static frame having the second resolution from the static layers. The second resolution is configured to be greater than the first resolution. An animated image having the second resolution is generated based on the at least one dynamic frame and the at least one static frame.

20 Claims, 11 Drawing Sheets

(51) Int. Cl.
*G11B 27/034* (2006.01)
*G11B 27/34* (2006.01)

(56) References Cited

U.S. PATENT DOCUMENTS

| 2006/0048056 A1 | 3/2006 | Huang |
| 2008/0307307 A1 | 12/2008 | Ciudad et al. |
| 2009/0010568 A1 | 1/2009 | Nakagami et al. |
| 2010/0079609 A1 | 4/2010 | Hwang et al. |

OTHER PUBLICATIONS

How to Make a Cinemagraph: Tutorial | Digett [online] [retrieved Oct. 18, 2011]. Retrieved from the Internet: <URL: http://www.digett.com/blog/07/12/2011/how-make-cinemagraph-tutorial>. (dated Jul. 12, 2011) 5 pages.

Use GIFBoom to Create Animated GIFs [iPhone] [online] [retrieved Oct. 18, 2011]. Retrieved from the Internet: <URL: http://www.makeuseof.com/tag/gifboom-create-animated-gifs-free-iphone/>. (dated Sep. 9, 2011) 8 pages.

Agarwala, A. et al., *Panoramic Video Textures*, To appear in the ACM SIGGRAPH 2005 Conference Proceedings (2005) 1-7.

Farsiu, S. et al., *Fast and Robust Multiframe Super Resolution*, IEEE Transactions on Image Procesing, vol. 13, No. 10 (Oct. 2004) pp. 1327-1344.

Freeman, W. T. et al., *Example-Based Super-Resolution*, Image-Based Modeling, Rendering, and Lighting, IEEE Computer Graphics and Applications (Mar./Apr. 2002) pp. 56-65.

Schodl, A. et al., *Video Textures*, Computer Graphics, SIGGRAPH'2000 Proceedings, (2000) 10 pages.

Tompkin, J. et al., Towards Moment Images: Automatic Cinemagraphs [online] [retrieved Jun. 9, 2016]. Retrieved from the Internet: <URL: http://vecg.cs.ucl.ac.uk/Projects/AutoCinemagraphs/> (redirected from http://www.cs.ucl.ac.uk/research/vr/Projects/AutoCinemagraphs/autocinemagraphs.pdf) CVMP 2011 (2011) 2 pages.

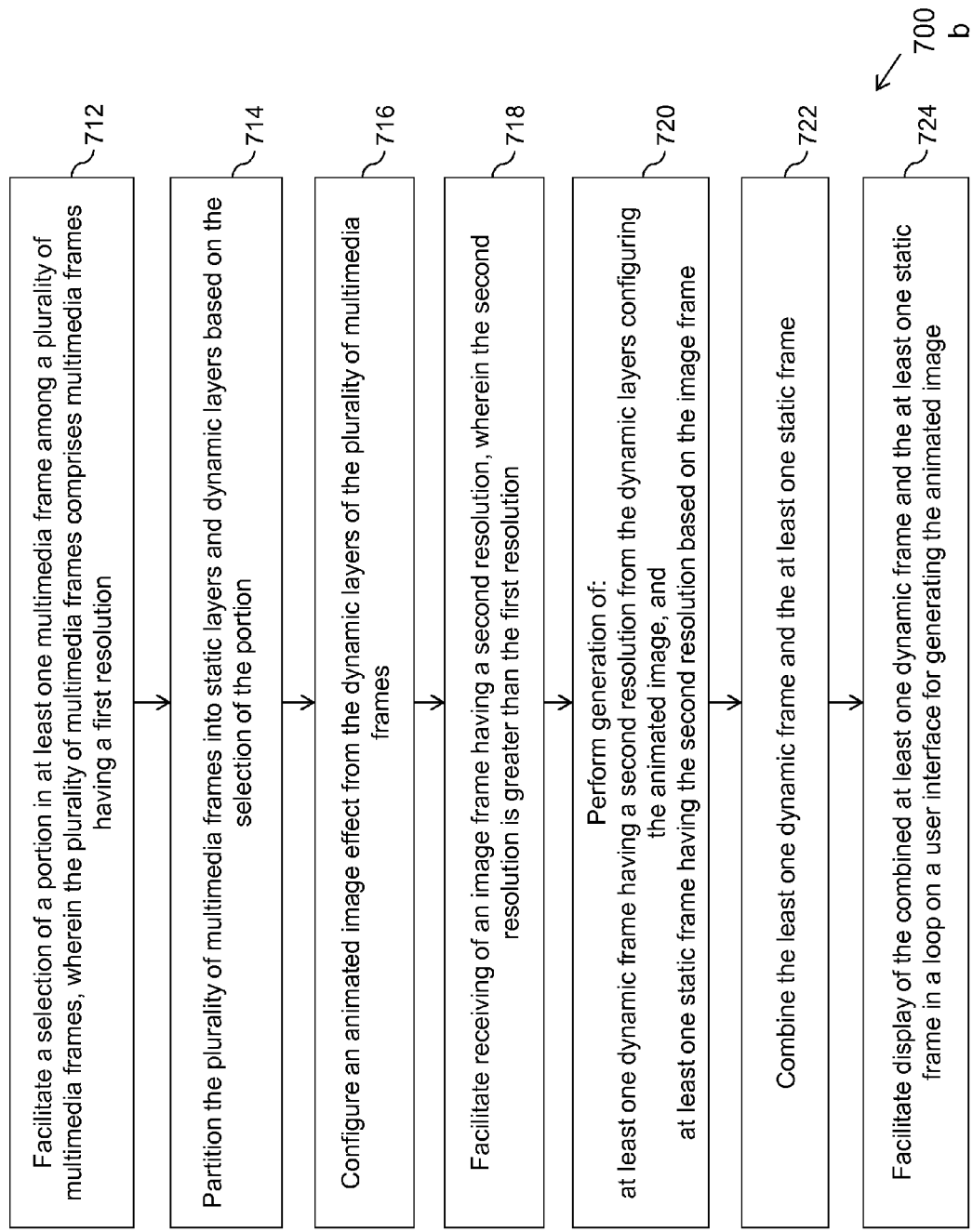

METHOD, APPARATUS AND COMPUTER PROGRAM PRODUCT FOR GENERATING ANIMATED IMAGES

RELATED APPLICATION

This application was originally filed as Patent Cooperation Treaty Application No. PCT/FI2012/051045 filed Oct. 31, 2012, which claims priority benefit to Indian Patent Application No. 4111/CHE/2011, filed Nov. 29, 2011.

TECHNICAL FIELD

Various implementations relate generally to method, apparatus, and computer program product for generation of animated images from multimedia content.

BACKGROUND

In recent years, various techniques have been developed for digitization and further processing of multimedia content. An example of multimedia content may include, but is not limited to a sequence of video frames. The digitization of the multimedia content facilitates in complex manipulation of the multimedia content for enhancing user experience with the digitized multimedia content. For example, the multimedia content may be manipulated and processed for generating animated images that may be utilized in a wide variety of applications. An animated image is a short seamlessly looping sequence of graphics interchange format images created from video content in which only parts of the image perform minor and repeated movement.

SUMMARY OF SOME EMBODIMENTS

Various aspects of examples of examples embodiments are set out in the claims.

In a first aspect, there is provided a method comprising: facilitating a selection of a portion in at least one multimedia frame among a plurality of multimedia frames, wherein the plurality of multimedia frames comprises multimedia frames having a first resolution; partitioning the plurality of multimedia frames into static layers and dynamic layers based on the selection of the portion; configuring an animated image effect from the dynamic layers of the plurality of multimedia frames; performing generation of: at least one dynamic frame having a second resolution from the dynamic layers configuring the animated image effect, wherein the second resolution is greater than the first resolution, and at least one static frame having the second resolution from the static layers of the plurality of multimedia frames; and generating an animated image having the second resolution based on the at least one dynamic frame and the at least one static frame.

In a second aspect, there is provided a method comprising: facilitating a selection of a portion in at least one multimedia frame among a plurality of multimedia frames, wherein the plurality of multimedia frames comprises multimedia frames having a first resolution; partitioning the plurality of multimedia frames into static layers and dynamic layers based on the selection of the portion; configuring an animated image effect from the dynamic layers of the plurality of multimedia frames; facilitating receiving of an image frame having a second resolution, wherein the image frame comprises an image frame content related to content associated with the plurality of multimedia frames and wherein the second resolution is greater than the first resolution; performing generation of: at least one dynamic frame having the second resolution from the dynamic layers configuring the animated image effect, and at least one static frame having the second resolution from the static layers of the plurality of multimedia frames based on the image frame; and generating an animated image having the second resolution based on the at least one dynamic frame and the at least one static frame.

In a third aspect, there is provided an apparatus comprising at least one processor; and at least one memory comprising computer program code, the at least one memory and the computer program code configured to, with the at least one processor, cause the apparatus to at least perform: facilitating a selection of a portion in at least one multimedia frame among a plurality of multimedia frames, wherein the plurality of multimedia frames comprises multimedia frames having a first resolution; partitioning the plurality of multimedia frames into static layers and dynamic layers based on the selection of the portion; configuring an animated image effect from the dynamic layers of the plurality of multimedia frames; performing generation of: at least one dynamic frame having a second resolution from the dynamic layers configuring the animated image effect, wherein the second resolution is greater than the first resolution, and at least one static frame having the second resolution from the static layers of the plurality of multimedia frames; and generating an animated image having the second resolution based on the at least one dynamic frame and the at least one static frame.

In a fourth aspect, there is provided an apparatus comprising at least one processor; and at least one memory comprising computer program code, the at least one memory and the computer program code configured to, with the at least one processor, cause the apparatus to at least perform: facilitating a selection of a portion in at least one multimedia frame among a plurality of multimedia frames, wherein the plurality of multimedia frames comprises multimedia frames having a first resolution; partitioning the plurality of multimedia frames into static layers and dynamic layers based on the selection of the portion; configuring an animated image effect from the dynamic layers of the plurality of multimedia frames; facilitating receiving of an image frame having a second resolution, wherein the image frame comprises an image frame content related to content associated with the plurality of multimedia frames and wherein the second resolution is greater than the first resolution; performing generation of: at least one dynamic frame having the second resolution from the dynamic layers configuring the animated image effect, and at least one static frame having the second resolution from the static layers of the plurality of multimedia frames based on the image frame; and generating an animated image having the second resolution based on the at least one dynamic frame and the at least one static frame.

In a fifth aspect, there is provided a computer program product comprising at least one computer-readable storage medium, the computer-readable storage medium comprising a set of instructions, which, when executed by one or more processors, cause an apparatus to perform at least: facilitating a selection of a portion in at least one multimedia frame among a plurality of multimedia frames, wherein the plurality of multimedia frames comprises multimedia frames having a first resolution; partitioning the plurality of multimedia frames into static layers and dynamic layers based on the selection of the portion; configuring an animated image effect from the dynamic layers of the plurality of multimedia frames; performing generation of: at least one dynamic frame having a second resolution from the dynamic layers configuring the animated image effect, wherein the second resolution is greater than the first resolution, and at least one static frame having the second resolution from the static layers of the plurality of multimedia frames; and generating an animated image having the second resolution based on the at least one dynamic frame and the at least one static frame.

In a sixth aspect, there is provided a computer program product comprising at least one computer-readable storage medium, the computer-readable storage medium comprising a set of instructions, which, when executed by one or more processors, cause an apparatus at least to perform: facilitating a selection of a portion in at least one multimedia frame among a plurality of multimedia frames, wherein the plurality of multimedia frames comprises multimedia frames having a first resolution; partitioning the plurality of multimedia frames into static layers and dynamic layers based on the selection of the portion; configuring an animated image effect from the dynamic layers of the plurality of multimedia frames; facilitating receiving of an image frame having a second resolution, wherein the image frame comprises an image frame content related to content associated with the plurality of multimedia frames and wherein the second resolution is greater than the first resolution; performing generation of: at least one dynamic frame having the second resolution from the dynamic layers configuring the animated image effect, and at least one static frame having the second resolution from the static layers of the plurality of multimedia frames based on the image frame; and generating an animated image having the second resolution based on the at least one dynamic frame and the at least one static frame.

In a seventh aspect, there is provided an apparatus comprising: means for facilitating a selection of a portion in at least one multimedia frame among a plurality of multimedia frames, wherein the plurality of multimedia frames comprises multimedia frames having a first resolution; means for partitioning the plurality of multimedia frames into static layers and dynamic layers based on the selection of the portion; means for configuring an animated image effect from the dynamic layers of the plurality of multimedia frames; means for performing generation of: at least one dynamic frame having a second resolution from the dynamic layers configuring the animated image effect, wherein the second resolution is greater than the first resolution, and at least one static frame having the second resolution from the static layers of the plurality of multimedia frames; and means for generating an animated image having the second resolution based on the at least one dynamic frame and the at least one static frame.

In a eighth aspect, there is provided an apparatus comprising: means for facilitating a selection of a portion in at least one multimedia frame among a plurality of multimedia frames, wherein the plurality of multimedia frames comprises multimedia frames having a first resolution; means for partitioning the plurality of multimedia frames into static layers and dynamic layers based on the selection of the portion; means for configuring an animated image effect from the dynamic layers of the plurality of multimedia frames; means for facilitating receiving of an image frame having a second resolution, wherein the image frame comprises an image frame content related to content associated with the plurality of multimedia frames and wherein the second resolution is greater than the first resolution; means for performing generation of: at least one dynamic frame having the second resolution from the dynamic layers configuring the animated image effect, and at least one static frame having the second resolution from the static layers of the plurality of multimedia frames based on the image frame; and means for generating an animated image having the second resolution based on the at least one dynamic frame and the at least one static frame.

In a ninth aspect, there is provided a computer program comprising program instructions which when executed by an apparatus, cause the apparatus to: facilitate a selection of a portion in at least one multimedia frame among a plurality of multimedia frames, wherein the plurality of multimedia frames comprises multimedia frames having a first resolution; partition the plurality of multimedia frames into static layers and dynamic layers based on the selection of the portion; configure an animated image effect from the dynamic layers of the plurality of multimedia frames; perform generation of: at least one dynamic frame having a second resolution from the dynamic layers configuring the animated image effect, wherein the second resolution is greater than the first resolution, and at least one static frame having the second resolution from the static layers of the plurality of multimedia frames; and generate an animated image having the second resolution based on the at least one dynamic frame and the at least one static frame.

In a tenth aspect, there is provided a computer program comprising program instructions which when executed by an apparatus, cause the apparatus to: facilitate a selection of a portion in at least one multimedia frame among a plurality of multimedia frames, wherein the plurality of multimedia frames comprises multimedia frames having a first resolution; partition the plurality of multimedia frames into static layers and dynamic layers based on the selection of the portion; configure an animated image effect from the dynamic layers of the plurality of multimedia frames; facilitate receiving of an image frame having a second resolution, wherein the image frame comprises an image frame content related to content associated with the plurality of multimedia frames and wherein the second resolution is greater than the first resolution; perform generation of: at least one dynamic frame having the second resolution from the dynamic layers configuring the animated image effect, and at least one static frame having the second resolution from the static layers of the plurality of multimedia frames based on the image frame; and generate an animated image having the second resolution based on the at least one dynamic frame and the at least one static frame.

BRIEF DESCRIPTION OF THE FIGURES

Various embodiments are illustrated by way of example, and not by way of limitation, in the figures of the accompanying drawings in which:

FIG. 7B is a flowchart depicting another example method for generation of animated image having a second resolution from a plurality of multimedia frames, in accordance with an example embodiment.

DETAILED DESCRIPTION

Example embodiments and their potential effects are understood by referring to FIGS. 1 through 7B of the drawings.

Figure 1:
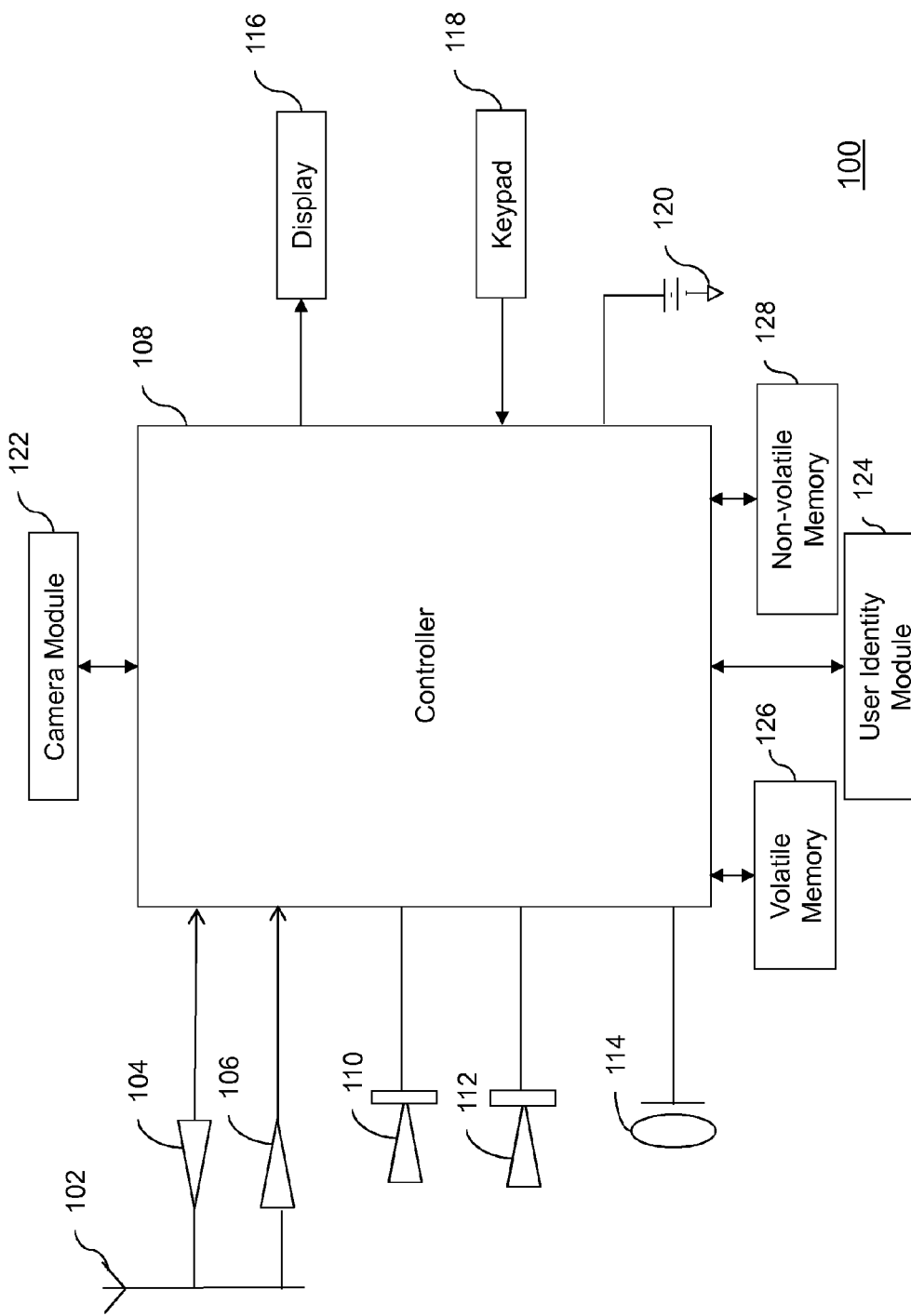
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor (s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
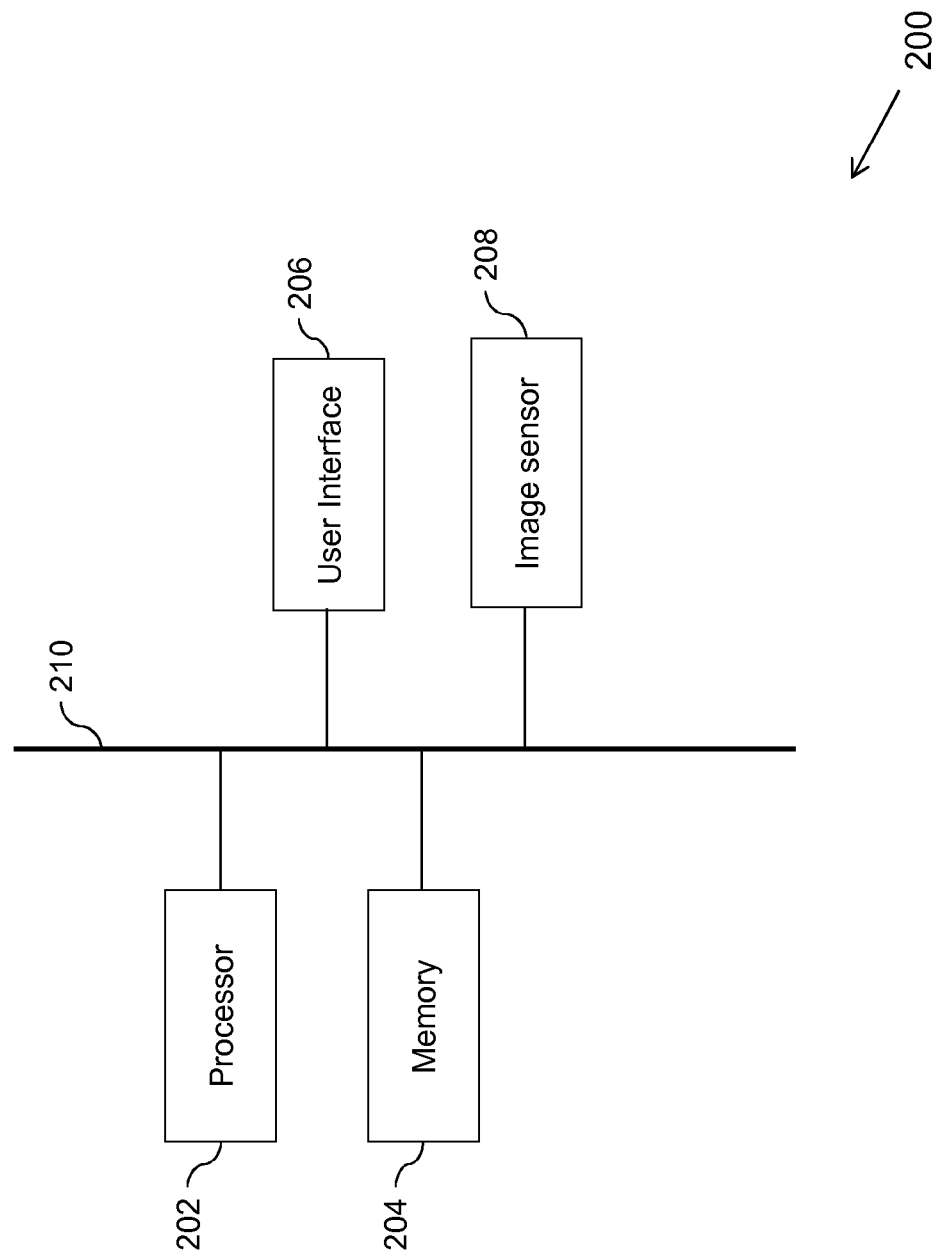
FIG. 2 illustrates an apparatus for generating an animated image in accordance with an example embodiment.

FIG. 2 illustrates an apparatus 200 for generating an animated image in accordance with an example embodiment. The apparatus 200 for generating the animated image may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices). Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising multimedia content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like.

Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the communication device may include a user interface, for example, the UI 206, having user interface circuitry and user interface software configured to facilitate a user to control at least one function of the communication device through use of a display and further configured to respond to user inputs. In an example embodiment, the communication device may include a display circuitry configured to display at least a portion of the user interface of the communication device. The display and display circuitry may be configured to facilitate the user to control at least one function of the communication device.

In an example embodiment, the communication device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive multimedia content. Examples of multimedia content may include audio content, video content, data, and a combination thereof.

In an example embodiment, the communication device may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100.

The components 202-208 may communicate with each other via a centralized circuit system 210 to perform generation of the animated image. The centralized circuit system 210 may be various devices configured to, among other things, provide or enable communication between the components 202-208 of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 202 is configured to, with the content of the memory 204, and optionally with other components described herein, to cause the apparatus 200 to generate an animated image having a second resolution from the multimedia content. In an embodiment, the multimedia content may be pre-recorded and stored in the apparatus 200. In another embodiment, the multimedia content may be captured by utilizing the camera module 122 of the device 100, and stored in the memory of the device 100. In yet another embodiment, the device 100 may receive the multimedia content from internal memory such as hard drive, random access memory (RAM) of the apparatus 200, or from external storage medium such as DVD, Compact Disk (CD), flash drive, memory card, or from external storage locations through Internet, Bluetooth®, and the like. The apparatus 200 may also receive the multimedia content from the memory 204.

In an embodiment, the multimedia content may comprise a plurality of multimedia frames. In an embodiment, the plurality of multimedia frames comprises a sequence of video frames. The sequence of video frames may correspond to a single scene of the multimedia content. In an embodiment, each multimedia frame of the plurality of multimedia frames has a first resolution. In an embodiment, the plurality of multimedia frames may correspond to video content captured by the image sensor 208 at the first resolution and stored in the memory 204. In an embodiment, the first resolution may correspond to a low resolution utilized for capturing video content by devices, for example, a camera, a camcorder and the like. Examples of the first resolution may include, but are not limited to resolutions of one megapixel or lower for capturing the multimedia frames of the plurality of multimedia frames.

In an example embodiment, the processor 202 is configured to, with the content of the memory 204, and optionally with other components described herein, to cause the apparatus 200 to facilitate a selection of a portion in at least one multimedia frame among a plurality of multimedia frames. In an embodiment, the selection of the portion comprises selection of at least one of an object (for example, a person, an entity or an article) and a region (for example, an area or a section) in one or more multimedia frames for imparting movement in an animation image to be generated from the plurality of multimedia frames. For example, the plurality of multimedia frames may depict a scene where a news reporter is presenting a commentary in breezy environmental conditions. One or more multimedia frames may depict a blowing of a hair portion of the news reporter while presenting the commentary. An object in the multimedia frame, for example the news reporter, or a region in the multimedia frame, for example an area in the multimedia frame depicting blowing of the hair portion may be selected for imparting repeated movement in the animated image. In an embodiment, the selection of the portion comprises selection of at least one of an object and a region in the at least one multimedia frame for retaining as a stationary object/region (with non-selected portions imparted with movement) in the animated image. In an embodiment, the selection of the portion is performed based on a user input.

In an embodiment, the user input is facilitated by one of a mouse click, a touch screen command, and a user gaze.

In an embodiment, the user may utilize the input interface of the user interface 206 for providing the selection of one of the object or the region in one or more multimedia frames for imparting movement in the animated image. In an embodiment, the selected portion may appear highlighted on the user interface 206. The user interface 206 for displaying the plurality of objects, the selected and deselected objects on the user interface 206, and various options for facilitating the selection of objects and/or options are described in detail in FIGS. 5A, 5B and 5C. In an example embodiment, a processing means may be configured to facilitate the selection of the portion in at least one multimedia frame among a plurality of multimedia frames. An example of the processing means may include the processor 202, which may be an example of the controller 108.

In an example embodiment, the processor 202 is configured to, with the content of the memory 204, and optionally with other components described herein, to cause the apparatus 200 to partition the plurality of multimedia frames into static (stationary) layers and dynamic (non-stationary) layers based on the selection of the portion. In an embodiment, upon selection of the portion (region and/or object) in a multimedia frame, the multimedia frame may be split into a static layer and a dynamic layer where a dynamic layer corresponds to content information in the multimedia frame selected to be imparted with movement in the animated image and the static layer corresponds to content information in the multimedia frame selected to be retained as stationary regions and/or objects, based on the selection of the portion. Similar portions (regions and/or objects) may be identified in one or more multimedia frames of the plurality of multimedia frames and similarly partitioned into static and dynamic layers.

In an embodiment, segmentation algorithms may be utilized for partitioning the one or more multimedia frames into the static layers and the dynamic layers. In an embodiment, segmentation may refer to a process of partitioning multimedia content, such as a video frame into multiple segments. In an embodiment, segmentation may be utilized for detecting boundaries or contours and/or between various objects in the multimedia content, thereby facilitating in detection of a plurality of distinct objects in the multimedia content. In an embodiment, a continuation of depth in the multimedia content forms an object, while a discontinuity is utilized for segmenting the objects. In an embodiment, the multimedia content is segmented into the static layers and dynamic layers based on a depth map (for example, map information corresponding to continuity/discontinuity in depth information related to objects/regions). In alternate embodiments, segmenting may be done by methods other than based on 'depth map' determination. For example, a texture or color based identification may be performed to identify regions similar to the selected portion and partition the plurality of multimedia frames into the static and dynamic layers.

In an embodiment, partitioning of the plurality of multimedia frames into the static and dynamic layers may be performed based on estimated areas of motion in addition to the selection of the portion. The areas of motion may be estimated based on one of pixel-intensity variance (background subtraction), image frequency analysis and block-matching algorithms. In an embodiment, detection of motion in the plurality of multimedia frames is performed by analyzing its optical flow where an optical flow may refer to a pattern of apparent motion of objects, surfaces, and edges in a scene. Upon computing the optical flow, areas of motion may be determined by analyzing a flow field, for example, by utilizing thresholding techniques. In an example embodiment, a processing means may be configured to partition the plurality of multimedia frames into the static layers and the dynamic layers based on the selection of the portion. An example of the processing means may include the processor 202, which may be an example of the controller 108.

In an example embodiment, the processor 202 is configured to, with the content of the memory 204, and optionally with other components described herein, to cause the apparatus 200 to configure an animated image effect from the dynamic layers of the plurality of multimedia frames. In an embodiment, the animated image effect may refer to minor and repeated movement of at least one object observed in image content with the remaining portions as stationary. Configuration of the animated image effect requires creation of a finite duration content that can be played continuously without any visible discontinuities. In an embodiment, for creation of a finite duration content that can be played continuously, a multimedia frame corresponding to a dynamic layer is identified from where a "jump" to a different multimedia frame corresponding to another dynamic layer can be made without noticeable artifacts. Using these jumps, infinite loops may be generated from a finite length multimedia content.

In an embodiment, a sum of squared difference (SSD) based technique may be utilized for configuring the animated image effect. A SSD matrix may be computed for each dynamic layer. The SSD indicates a similarity between multimedia frames corresponding to the dynamic layers. A loop without temporal artifacts requires a small SSD between the first and the last multimedia frame. The multimedia frame corresponding to the selected portion may serve as a key frame to be included in the looping motion and may be used as a starting point for a loop search within the SSD matrix. An iterative search may be performed over one or more loop lengths and SSD thresholds. A list of possible loops containing the key frame, sorted first by order of SSD and then by length, may be generated. A suitable-combination of loop length and SSD may be chosen for constructing the animated image effect. In an embodiment, multimedia frames (corresponding to the dynamic layers) at the end of the looping animated image may be interpolated to smoothly return to the starting multimedia frame.

In an embodiment, a video-texture based technique may be utilized for constructing the animated image effect. Video textures are essentially Markov processes, with each state corresponding to a dynamic layer, and the probabilities corresponding to the likelihood of transitions from one dynamic layer to another dynamic layer. The dynamic layers may be analyzed and suitable transition points identified based on the analysis and stored in a data table as a video texture representation. A new multimedia content may then be synthesized by determining an order of playing/displaying dynamic layers for configuring the animated image effect. In an embodiment, sequencing may be performed based on random play, which may utilize a Monte-Carlo (stochastic) technique to determine which dynamic layer should be played after a given dynamic layer, using the table of section-to-section similarities computed by an analysis algorithm. In an embodiment, a small number of transitions are selected in a manner that the dynamic layers are guaranteed to loop after a specified number of such layers.

In an embodiment, in addition to maintaining a continuity of the video textures, dynamics of motion across the dynamic layers are also preserved. For example, if a dynamic layer includes content corresponding to a top-tobottom movement of a giant wheel then transitioning from such a dynamic layer to another dynamic layer including content that corresponds to the top-to-bottom movement will create an abrupt and unacceptable change in the giant wheel's motion. In an embodiment, dynamics of motion across the dynamic layers are preserved by requiring that for a dynamic layer to be classified as similar to some other dynamic layer, not only the dynamic layers themselves, but also temporally adjacent dynamic layers within some weighted window must be similar to each other. In an example embodiment, a processing means may be configured to configure the animated image effect from the dynamic layers of the plurality of multimedia frames. An example of the processing means may include the processor 202, which may be an example of the controller 108.

In an example embodiment, the processor 202 is configured to, with the content of the memory 204, and optionally with other components described herein, to cause the apparatus 200 to perform generation of at least one dynamic frame having a second resolution from the dynamic layers configuring the animated image effect. In an embodiment, the second resolution is configured to be greater than the first resolution. In an embodiment, the second resolution may correspond to a super-resolution (for example, very high resolution such as a 8 megapixel resolution or a 10 megapixel resolution) equivalent enhancement in resolution. In an embodiment, the second resolution may correspond to a resolution utilized for capturing still pictures by devices, for example, a camera, a camcorder and the like. Examples of the second resolution may include, but are not limited to, resolutions sufficiently greater than 1 megapixel resolution, such as an 8-megapixel resolution or a 10-megapixel resolution. In an embodiment, one or more dynamic frames having the second resolution may correspond to super-resolved form of the multimedia frames corresponding to the dynamic layers configured with the animated image effect. The super-resolved form of the multimedia frames may be generated by techniques, for example using super-resolution techniques that enhance a resolution of the imaging system. In an embodiment, generation of the at least one dynamic frame from the dynamic layers is performed based on multi-frame based super-resolution. In the multi-frame based super-resolution, multiple frames of the similar frames are utilized to achieve a higher resolution for enhancing the resolution of the multimedia frames.

In an embodiment, the generation of the at least one dynamic frame from the dynamic layers is performed based on an example based super-resolution. The example based super-resolution refers to a learning based algorithmic technique wherein the algorithm learns the fine details that correspond to different multimedia frame sections seen at a low-resolution and then uses those learned relationships to predict fine details in other multimedia frame sections. Training images, modified for generalization by appropriate preprocessing, may be utilized for creating plausible image information in other images. For generating the training images, high-resolution images may be degraded, for example by bluffing and subsampling to create low-resolution images with reduced number of original pixels in each dimension. For reducing resolution by higher factors, analytic interpolation techniques, such as cubic spline may be applied to generate images of the desired number of pixels that lacks high-resolution detail. The training images may only store the differences between the image's cubic-spline interpolation and the original high-resolution image. The training images may thus comprise high-resolution patch corresponding to every possible low-resolution image patch. For each first resolution (low resolution) dynamic layer of the plurality of multimedia frame, a corresponding low-resolution patch may be identified among the low-resolution patches in the set of training images and for the identified low-resolution patch, a corresponding high-resolution patch (based on stored relation in the training image set) may be determined by a nearest neighbor search from the training set based on the local low-frequency details and adjacent, previously determined high-frequency patches. The identified high-resolution patches may then be utilized to generate the at least one dynamic frame having the second resolution (higher resolution or super-resolution). In an example embodiment, a processing means may be configured to perform generation of the at least one dynamic frame having the second resolution from the dynamic layers configuring the animated image effect. An example of the processing means may include the processor 202, which may be an example of the controller 108.

In an example embodiment, the processor 202 is configured to, with the content of the memory 204, and optionally with other components described herein, to cause the apparatus 200 to perform generation of at least one static frame having the second resolution from the static layers of the plurality of multimedia frames. In an embodiment, the generation of the at least one static frame having the second resolution from the static layers of the plurality of multimedia frames are performed based on registration based super-resolution. The registration based super-resolution provides a fast and robust super-resolution algorithm utilizing non iterative data fusing of first resolution (low resolution) static layers using pre-determined median operators and further performs iterative deblurring and interpolation to obtain the second resolution (higher resolution) static frame from the static layers. In an embodiment, the registration based super-resolution may utilize static layers corresponding to multiple multimedia frames having the first resolution to generating a static frame having the second resolution. For example, static layers corresponding to eight multimedia frames having a one megapixel resolution may be utilized for generating a static frame having an 8-megapixel resolution.

In an embodiment, the static layers are registered with respect to a reference frame defining a non-uniformly spaced high-resolution (HR) grid. An interpolation method, for example Delaunay triangulation, may be used for creating a noisy and blurred high resolution static frame, which may be subsequently deblurred for generating the static frame at the second resolution from the static layers. In an example embodiment, a processing means may be configured to perform generation of the at least one static frame having the second resolution from the static layers of the plurality of multimedia frames. An example of the processing means may include the processor 202, which may be an example of the controller 108.

In an example embodiment, the processor 202 is configured to, with the content of the memory 204, and optionally with other components described herein, to cause the apparatus 200 to generate an animated image having the second resolution based on the at least one dynamic frame and the at least one static frame. In an embodiment, the at least one dynamic frame and the at least one static frame are combined prior to generation of the animated image and a display of the combined at least one dynamic frame and the at least one static frame is facilitated in a loop on a user interface for generating the animated image. In an embodiment, the animated image is displayed on the user interface 206. The display of the animated image on the user interface is explained in FIG. 6. As explained above, the dynamic frame(s) having the second resolution are generated from the dynamic layers configured with the animated image effect, and, the static frame(s) having the second resolution are generated from the static layers. Combining the dynamic frames (configured with the animated image effect on account of the configuration from the dynamic layers) and the static frames, each having the second resolution, generates the animated image having the second resolution.

In an embodiment, image blending techniques may be utilized for combining the dynamic frames and the static frame(s). The image blending techniques may involve cross-fading or morphing across transitions. In an embodiment, the static and the dynamic frames before and after the transition may be blended together with standard cross-fading. In an embodiment, cross-fading algorithm may support multi way cross-fades, i.e., more than two subsequences can be blended together at a time. Another approach to reducing the blurriness of the transitions may include morphing the two sequences together, so that common features in the static frame(s) and the dynamic frame(s) are aligned.

In an embodiment, the dynamic frames induced with the animated image effect may already include an infinite looping of the content corresponding to the dynamic layers. A static frame having the second resolution may be included in the loop such that the loop now includes static frame and the dynamic frames. The inclusion of the static frame in the loop of dynamic frames may be performed in a manner wherein only the static portions of the dynamic frames are superimposed by the static frame whereas the dynamic portions of the dynamic frames include the animated image effect. In an example embodiment, a processing means may be configured to generate an animated image having the second resolution based on the at least one dynamic frame and the at least one static frame. An example of the processing means may include the processor 202, which may be an example of the controller 108. In an example embodiment, a processing means may be configured to 200 to facilitate display of the combined at least one dynamic frame and the at least one static frame in a loop on a user interface. An example of the processing means may include the processor 202, which may be an example of the controller 108.

In an example embodiment, the processor 202 is configured to, with the content of the memory 204, and optionally with other components described herein, to cause the apparatus 200 to perform a registration of the static layers of the plurality of multimedia frames prior to generation of the at least one static frame from the static layers. In an embodiment, registration may refer to process wherein object motion may be separated from motion of media capture medium and all background pixels may be made static in a common multimedia frame. In an embodiment, the registration of the stationary sections may be performed to align similar content across the static layers and remove jitter introduced either on account of movement of media capture medium (e.g., from being handheld) or account of transient environmental conditions, such as high wind conditions, during the capture of the multimedia content. Two-dimensional (2D) and three-dimensional (3D) multimedia stabilization algorithms may be employed for performing the registration. In an embodiment, the 2D algorithms may estimate camera motion in the 2D image plane motion and zoom or crop to compensate. The motion may be evaluated in a variety of ways, including optical flow, stable feature points, and block-based cross-correlation. In an embodiment, 3D video stabilization algorithms may identify stable 3D feature points by structure-from-motion and apply image based or warping techniques to cope with parallax effect. In an example embodiment, a processing means may be configured to perform the registration of the static layers of the plurality of multimedia frames prior to generation of the at least one static frame from the static layers. An example of the processing means may include the processor 202, which may be an example of the controller 108.

In an example embodiment, the processor 202 is configured to, with the content of the memory 204, and optionally with other components described herein, to cause the apparatus 200 to facilitate receiving of an image frame having the second resolution. In an embodiment, the image frame comprises an image frame content related to content associated with the plurality of multimedia frames, for example including content corresponding to a same scene as that included in the plurality of multimedia frames. In an embodiment, receiving the image frame, for example a still image, may be facilitated by utilizing the image sensor 208 for capturing the image frame. In an embodiment, the image frame may be captured during the capture of the multimedia content corresponding to the plurality of multimedia frames. In an embodiment, the image frame may be stored in memory 204 and its receipt from the memory 204 facilitated by user selection, for example using a mouse click or a touch screen command. In an example embodiment, a processing means may be configured to 200 to facilitate receiving of the image frame having the second resolution. An example of the processing means may include the processor 202, which may be an example of the controller 108.

In an embodiment, the at least one static frame may be generated from the static layers of the plurality of multimedia frames based on the image frame. In an embodiment, the image frame may be registered based on a multimedia frame, for example a sample multimedia frame, of the plurality of multimedia frames. A comparison may be performed between the static layers of the plurality of multimedia frames and the registered image frame. Based on the comparison, static regions in the registered image frame matching the static layers may be selected for generation of one or more static frames. In an embodiment, the generated static frame(s) from the static regions in the registered image have a second resolution (higher resolution) on account of the received image frame having the higher resolution. The generation of the static frame(s) from the static layers may be performed as explained above. In an example embodiment, a processing means may be configured to perform registration of the image frame, a comparison between the static layers of the plurality of multimedia frames and the registered image frame, and a selection of the static regions in the registered image frame matching the static layers based on the comparison. An example of the processing means may include the processor 202, which may be an example of the controller 108. An animated image having the second resolution may then be generated from the static and dynamic frames. Various embodiments of generating animated image having the second resolution are further described in FIGS. 3A to 7B.

Figure 3A:
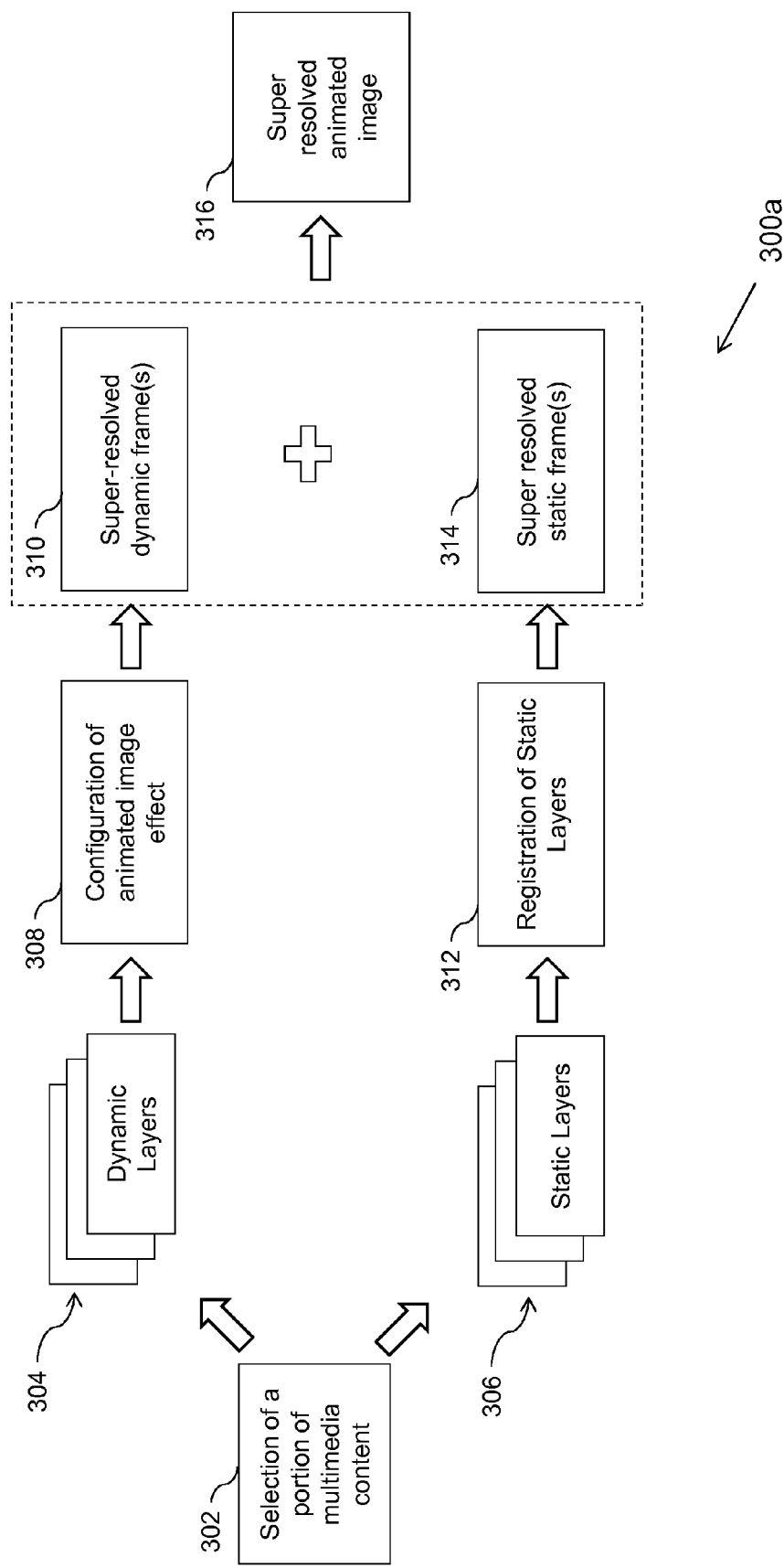
FIG. 3A illustrates a logical sequence for generating a super-resolved animated image in accordance with an example embodiment.

FIG. 3A illustrates a logical sequence 300*a* for generating a super-resolved animated image in accordance with an example embodiment. In an embodiment, the logical sequence 300*a* may be employed by the apparatus 200 for generating the super-resolved animated image. The sequence 300*a* starts at 302. At 302, a selection of a portion of a multimedia content is received. The multimedia content comprises a plurality of multimedia frames, for example a sequence of video frames, captured or recorded at a low resolution. An example of low resolution may be one megapixel or lower pixel resolution utilized by devices like camera or camcorder for recording multimedia content. In an embodiment, the plurality of multimedia frames may be displayed on a user interface, such as the user interface 206, and the selection of the portion of the multimedia frame may be received by user selection, for example, by using one of a mouse click, a touch screen gesture or a user gaze. In an embodiment, the selected portion in the multimedia frame may be highlighted subsequent to receiving the selection. In an embodiment, the selection of the portion may indicate a choice of a region and/or object to be imparted with movement in the animated image. In an embodiment, the selection of the portion may indicate a choice of a region and/or an object to be kept stationary in the animated image.

Based on the selected portion, the plurality of multimedia frames may be partitioned into dynamic layers at 304 and static layers at 306. In an embodiment, the dynamic layers may correspond to portions in the plurality of multimedia frames similar to the portion to be imparted with movement in the animated image, and, the static layers may correspond to portions in the plurality of multimedia frames similar to the portion to be kept stationary in the animated image. At 308, an animated image effect is configured from the dynamic layers of the plurality of multimedia frames. The animated image effect includes an image portion imparted with minor and repeated movement of at least one object and/or region while the remaining image portions are stationary. The animated image effect may be configured from the dynamic layers using techniques like video texture representation or SSD matrix as explained in FIG. 2. In an embodiment, the animated image effect may be configured automatically from the dynamic layers based on standard algorithms for generating animated image effect. At 310, one or more super-resolved dynamic frames may be generated from the dynamic layers configuring the animated image effect. The super-resolved dynamic frame(s) may correspond to conversion to a very high resolution, for example resolutions of 8 megapixel resolution or higher, of dynamic layers configuring the animated image effect. The conversion to a very high resolution, for example super-resolution, may be performed using techniques like multi-frame based super-resolution, example based super-resolution and the like.

At 312, the static layers of the plurality of multimedia frames may be registered as explained in FIG. 2 and one or more super-resolved static frames may be generated from the registered static layers at 314. The super-resolved static frame(s) may correspond to conversion to a very high resolution frame from the static layers. The conversion to a very high resolution, for example super-resolution, may be performed using techniques wherein similar portions of multiple frames are utilized for resolution enhancement. In an embodiment, registration based super-resolution may be utilized for generation of the super-resolved static frame(s).

In an embodiment, the steps 308-310 and 312-314 may be performed in parallel manner. In an embodiment, the generation of super-resolved static frame(s) may one of precede or succeed the generation of the super-resolved dynamic frame(s). At 316, the super-resolved static frame(s) and the super-resolved dynamic frame(s) are combined and the super-resolved animated image is generated. As explained in FIG. 2, image blending techniques may be utilized for combining the static frame(s) and the dynamic frames. In an embodiment, the image blending techniques may be utilized for superimposing the static frame over the static portions of the dynamic frames while retaining the portion showing animated image effect. Since, the static frame and the dynamic frames are generated at super-resolution, the generated animated image is generated at super-resolution.

Figure 3B:
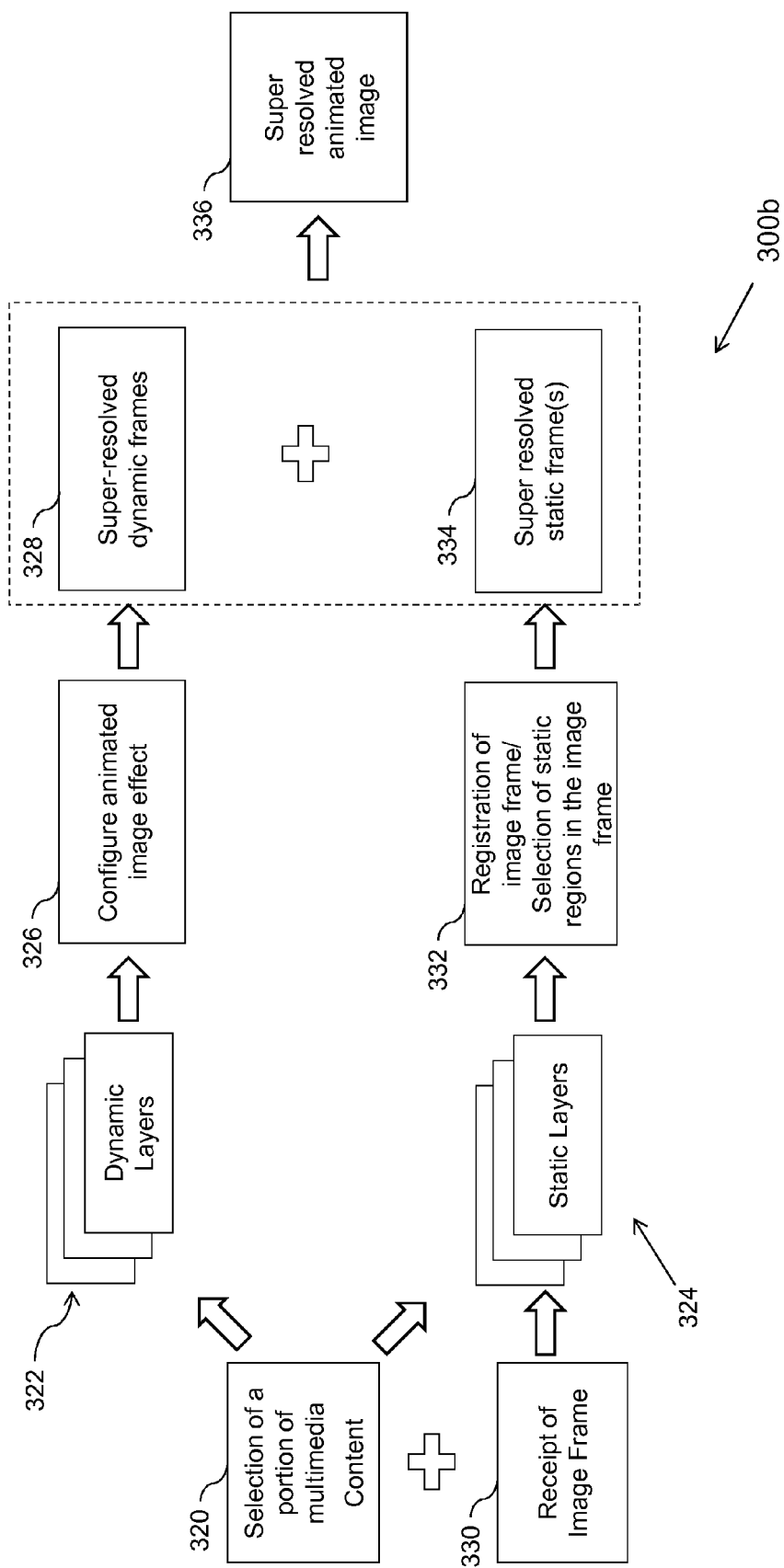
FIG. 3B illustrates a logical sequence for generating a super-resolved animated image in accordance with another example embodiment.

FIG. 3B illustrates a logical sequence 300b for generating a super-resolved animated image in accordance with another example embodiment. In an embodiment, the logical sequence 300b may be employed by the apparatus 200 for generating the super-resolved animated images. The sequence 300b starts at 320. At 320, a selection of a portion of a multimedia content is received. A plurality of multimedia frames corresponding to the multimedia content is partitioned into dynamic layers at 322 and static layers at 324 based on selection of a portion of a multimedia frame of the multimedia content. At 326, animated image effect is configured from the dynamic layers of the plurality of multimedia frames and at 328, super-resolved dynamic frame(s) are generated from the dynamic layers configuring the animated image effect. The selection of the portion of the multimedia frame, the partitioning of the multimedia frames into static and dynamic layers, the configuration of the animated image effect and the generation of the super-resolved dynamic frame(s) is performed as explained in logical sequence 300a (302-304 and 308-310).

At 330, an image frame at super-resolution (for example, very high resolution, such as a resolution sufficiently greater than a one megapixel resolution like an 8-megapixel resolution or a 10-megapixel resolution) is received. In an embodiment, the image frame corresponds to a still image captured at a very high resolution, for example, above 8 mega pixel resolution, by a media capture device, for example a camera. In an embodiment, the image frame may be captured by an image sensor, such as the image sensor 208 of the apparatus 200, while capturing the multimedia content. In an embodiment, the image frame may be received from a stored location in a memory, for example memory 204 of the apparatus 200. In an embodiment, the image frame comprises an image frame content related to content associated with the plurality of multimedia frames, for example content corresponding to a same scene as that included in the plurality of multimedia frames.

At 332, the image frame is registered based on a multimedia frame, for example a sample multimedia frame, of the plurality of multimedia frames. In an embodiment, a comparison may be performed between the static layers of the plurality of multimedia frames and the registered image frame. Based on the comparison, static regions in the registered image frame matching the static layers may be selected. At 334, one or more static frames are generated from the static layers of the plurality of multimedia frames based on the image frame (for example, the static regions in the registered image). In an embodiment, the generated static frame(s) have a super-resolution on account of the received image frame being captured at a super-resolution.

In an embodiment, the steps 332-334 and 326-328 may be performed in parallel manner. In an embodiment, the generation of super-resolved static frame(s) may one of precede or succeed the generation of the super-resolved dynamic frame(s). At 334, the super-resolved static frame(s) and the super-resolved dynamic frame(s) are combined and the super-resolved animated image is generated. As explained in FIG. 2, image blending techniques may be utilized for combining the static frame(s) and the dynamic frame(s). In an embodiment, the image blending techniques may be utilized for superimposing the static frame(s) over the static portions of the dynamic frame(s) while retaining the portion showing animated image effect. Since, the static frame and the dynamic frames are combined at super-resolution, the animated image is generated at super-resolution.

Figure 4:
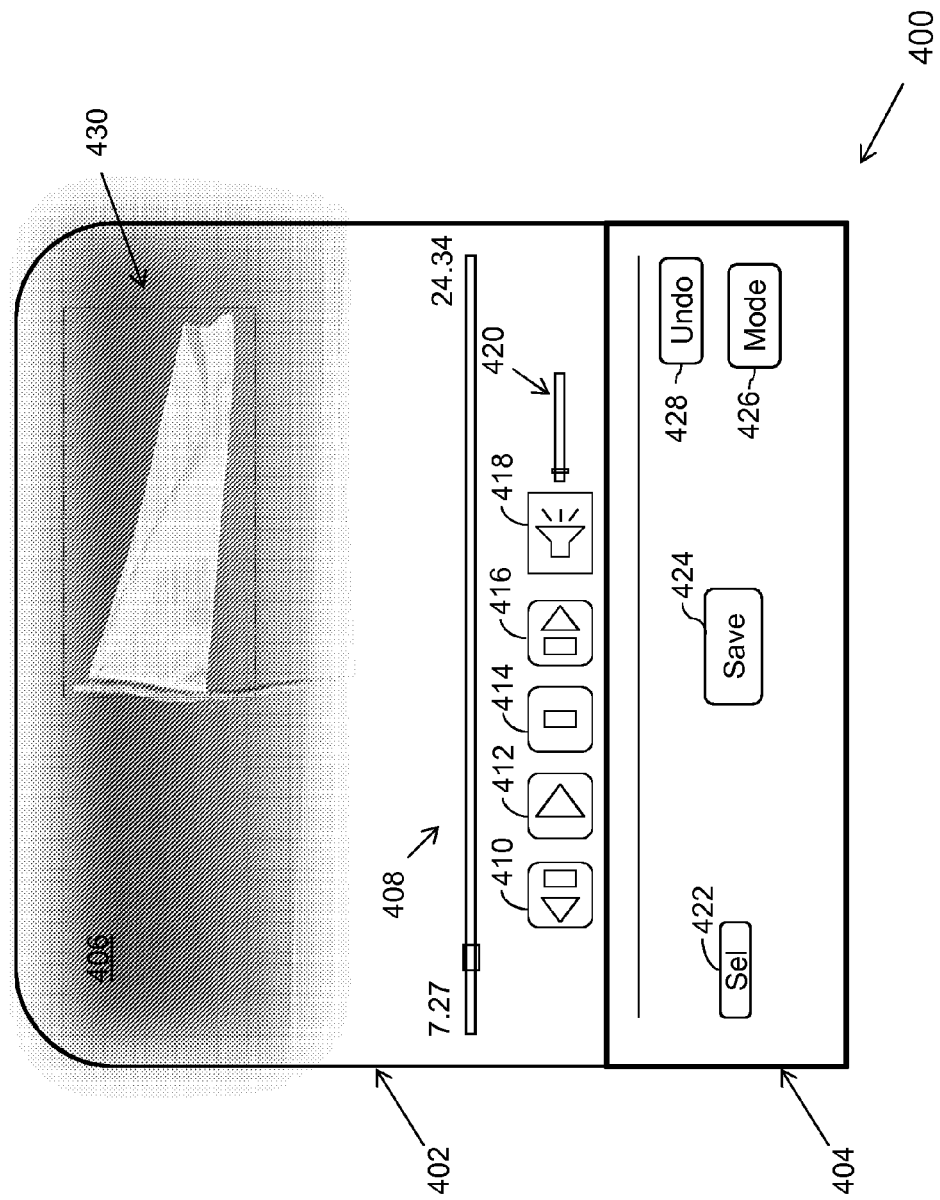
FIG. 4 illustrates a user interface (UI) for facilitating selection of a portion of multimedia content for generation of a super-resolved animated image in accordance with an example embodiment.

FIG. 4 illustrates a user interface (UI) 400 for facilitating selection of a portion of multimedia content for generation of a super-resolved animated image in accordance with an example embodiment. The UI 400 may be employed in an apparatus, such as apparatus 200. In an embodiment, UI 400 may be an example of the user interface 206 of the apparatus 200. The UI 400 is depicted to include a screen display area 402 and an option display area 404. In an embodiment, the screen display area 402 is configured to display multimedia content stored in the apparatus, for example in memory 204 of the apparatus 200. In an embodiment, the screen display area 402 may be configured to display scenes unfolding in surrounding environment. In an embodiment, scenes may be captured/recorded by an image sensor, for example the image sensor 208, or a camera and stored in the memory as multimedia content.

In FIG. 4, the screen display area 402 displays a scene 406 of a waving flag along with a plurality of content playback options. During playback of multimedia content, scenes corresponding to a plurality of multimedia frames in the multimedia content are displayed in an on-going manner and the scene 406 may correspond to one such multimedia frame in the multimedia content. The content playback options depict a content slide bar 408, a rewind content tab 410, play content tab 412, a stop content tab 414, a forward content tab 416, a volume turn on/off tab 418 and a volume control slide bar 420. The content slide bar 408 is configured to provide an indication of a time duration, or length, of multimedia content playback and also an indication of time elapsed from an initiation of playback for display of a current scene. In FIG. 4, the length for the multimedia content playback is displayed as 24.34 indicating a time duration of 24 minutes and 34 seconds and a time elapsed since initiation of the playback for display of the current scene to be 7.27 indicating a 7 minutes and 27 seconds time duration. The rewind content tab 410, the play content tab 412, the stop content tab 414, the forward content tab 416 are configured to reverse playback of multimedia content, initiate playback of multimedia content, stop playback of multimedia content and advance playback of the multimedia content, respectively. The volume turn/off tab 418 is configured to turn on or mute a sound component associated with the playback of the multimedia content and the volume control slide bar 420 is configured to enable a controlling of an intensity of the sound component associated with the playback of the multimedia content.

In FIG. 4, the options display area 404 is depicted to include a plurality of tabs, such as a selection tab (shown as 'Sel') 422, a save tab (shown as 'Save') 424, a mode selection tab (shown as 'Mode') 426, and a selection undo tab (shown as 'undo') 428. The plurality of tabs in the options display area 404 are configured to facilitate provisioning of various options for selection of the at least one object or region in a multimedia frame of the multimedia content in order to generate an animated image.

In an embodiment, the selection tab 422 is configured to facilitate selection of a portion (for example, an object or a region) of a scene being displayed on the screen display area 402. In an embodiment, upon selection of the selection tab 422, a playback of the content may be paused and a cursor or a pointer may appear on the screen display area 402 for enabling selection of the portion of the scene. In an embodiment, the selection of the portion may be facilitated by user selection. In an embodiment, the portion may be selected by pointing a pointing device, such as a mouse at the portion on the UI 400, without even operating the selection tab 422. In various other embodiments, the selection may be performed by utilizing a touch screen user interface, a user gaze selection and the like. In an embodiment, the selection of the portion may indicate a choice of portion for imparting movement in the animated image. In an embodiment, the selection of the portion may indicate a choice of portion for retaining as stationary in the animated image. The remaining portions in the multimedia frame may be considered as the indication of the choice for imparting the movement in the animated image.

In FIG. 4, a selection of a portion 430 (marked by dotted rectangle) including a waving flag is depicted. In an embodiment, based on the selection of the portion 430, the multimedia frame corresponding to the scene 406 and a plurality of multimedia frames including similar scenes or related scenes in the multimedia content may be partitioned into static layers and dynamic layers. The dynamic layers may correspond to regions in the plurality of multimedia frames to be imparted with movement and the static layers may correspond to regions in the plurality of multimedia frames to be retained as stationary. The multimedia frame corresponding to the scene 406 may be partitioned with the selected portion 430 as a dynamic layer and the remaining portions (un-selected portions) of the multimedia frame as a static layer. The plurality of multimedia frames including similar portions may be partitioned based on the selected portion to generate dynamic and static layers.

In an embodiment, the save tab 424 may be configured to facilitate a saving of the selection of the portion whereas the selection undo tab 428 may be configured to facilitate in reversing the last selected and/or saved options. For example, upon selecting the portion 430, the user may decide to deselect the portion 430, and instead select another portion in the same or a different multimedia frame/scene. In an embodiment, the selection undo tab 428 may be operated for reversing the selection of the portion 430, and thereafter another portion may be selected by operating the selection tab 422 in the option display area 404.

In an embodiment, the mode selection tab 426 may be configured to facilitate selection of one of viewfinder mode and a content playback mode. In an embodiment, the viewfinder mode may be utilized for viewing scenes unfolding in surrounding environment and further capturing the scene(s) as a still frame or a multimedia content, such as a sequence of video frames. In an embodiment, the playback mode may be utilized for displaying the captured multimedia content or any multimedia content stored in the apparatus. In an embodiment, selection of various tabs, for example, the selection tab 422, the save tab 424, the selection undo tab 426 and the mode selection tab 426 may be facilitated by a user action. Also, as disclosed herein in various embodiments, various options being displayed in the options display area 404 are represented by tabs. It will however be understood that these options may be displayed or represented in various devices by various other means, such as push buttons, and user selectable arrangements. In an embodiment, selection of the portion and various other options in the UI, for example the UI 400, may be performed by, for example, a mouse-click, a touch screen user interface, detection of a gaze of a user and the like. Various embodiments describing the selection of the portion in the UI 400 are described in FIGS. 5A, 5B and 5C.

Figure 5A:
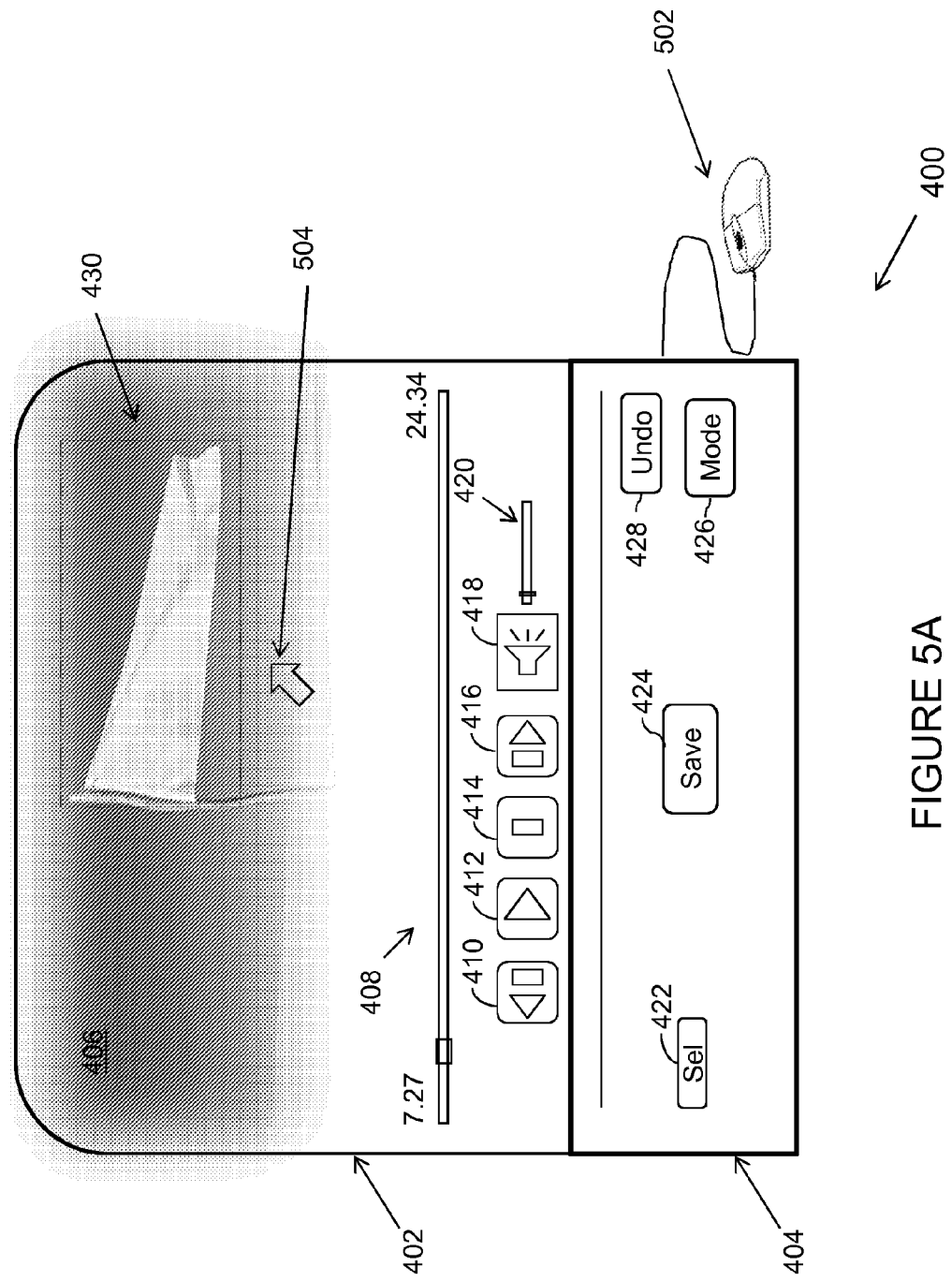
FIGS. 5A, 5B and 5C illustrate various embodiments for performing selection of the portion in a multimedia frame for generating a super-resolved animated image in accordance with various example embodiments.
Figure 5B:
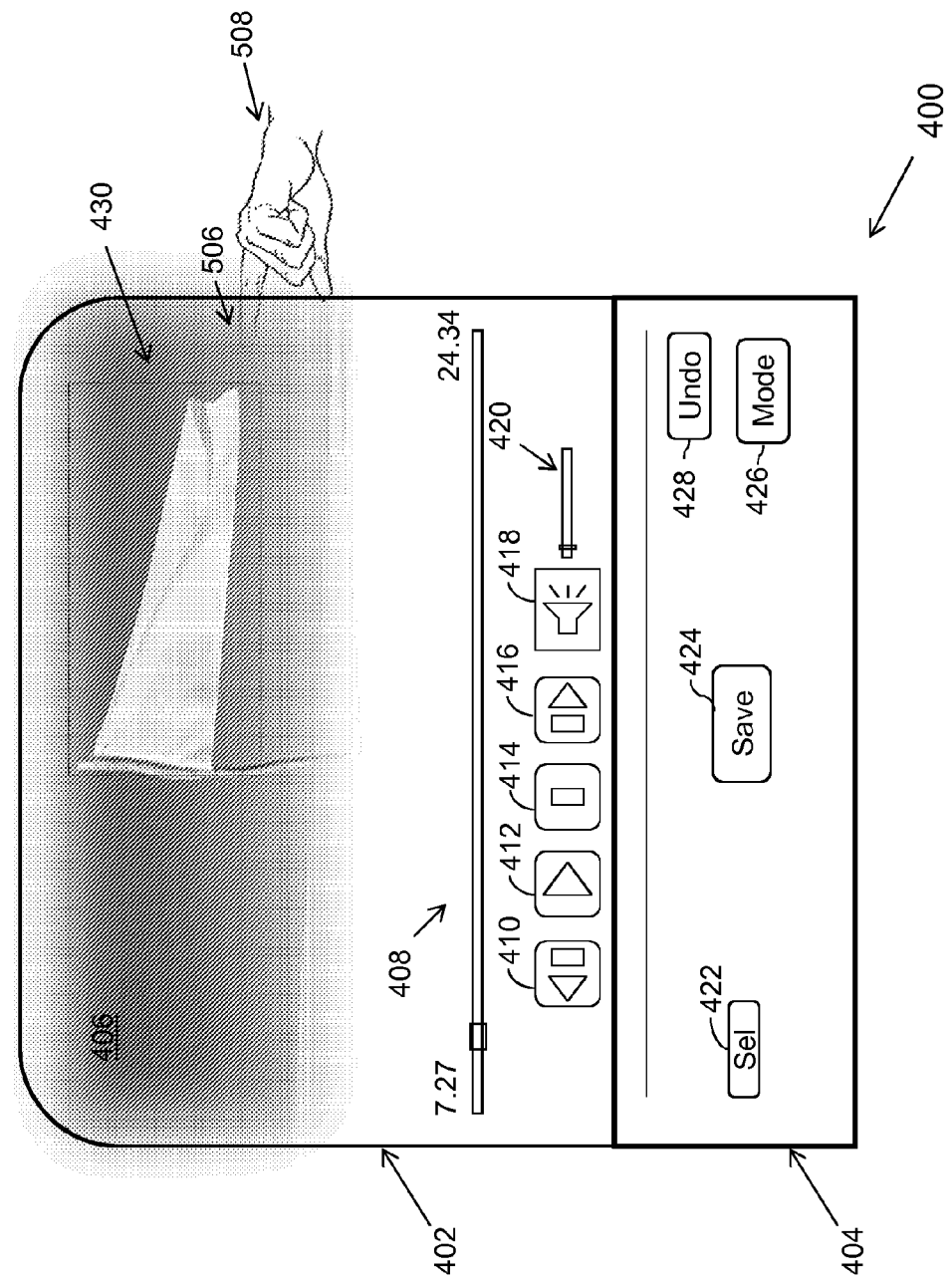
Figure 5C:
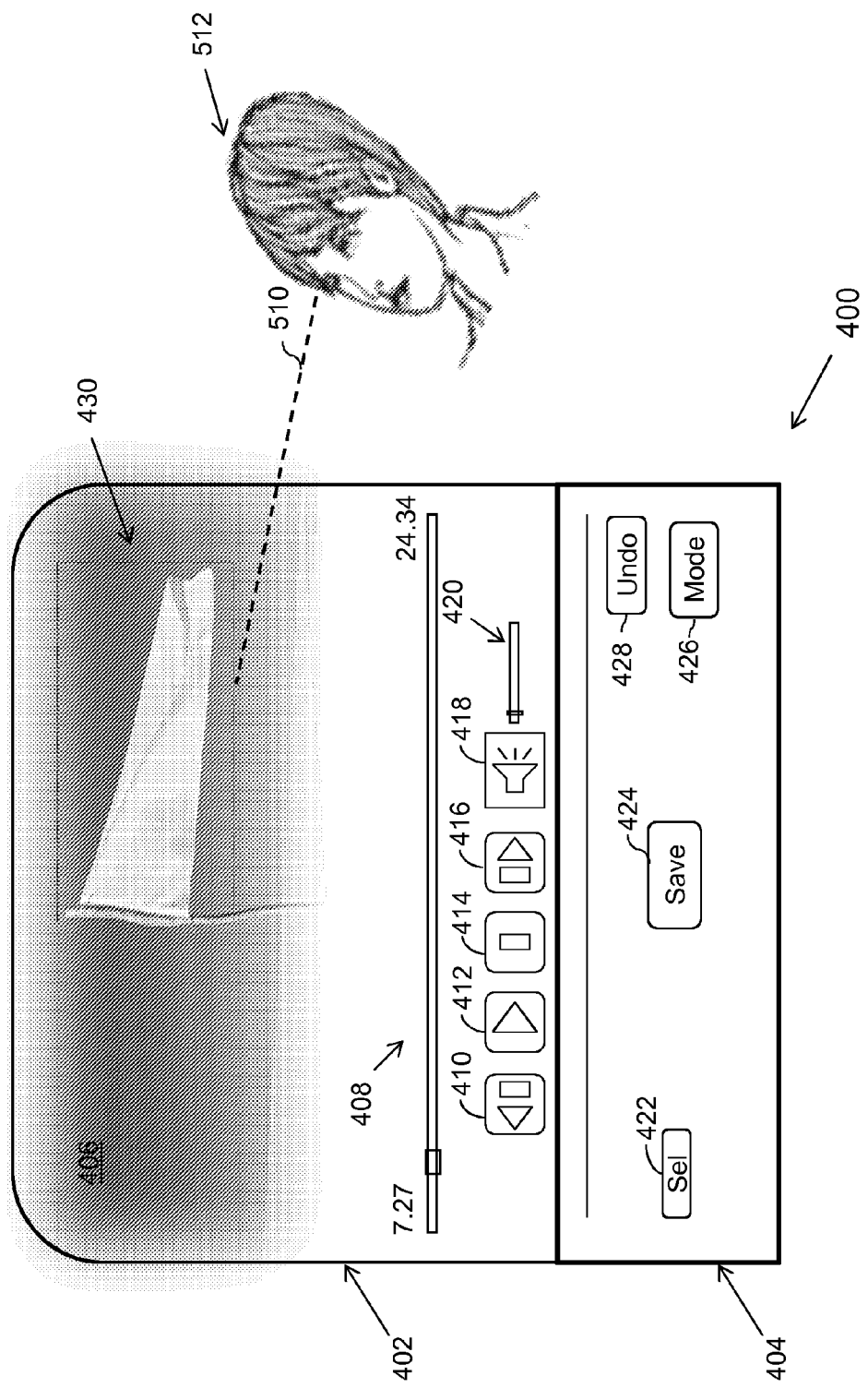

FIGS. 5A, 5B and 5C illustrate various embodiments for performing selection of the portion in a multimedia frame for generating a super-resolved animated image in accordance with various example embodiments. For example, FIG. 5A illustrates selection of the portion and/or options by means of a mouse. As illustrated in FIG. 5A, a portion, for example the portion 430 is selected by a click of a, for example, a mouse 502. In alternative embodiments, the mouse 502 may be replaced by any other pointing device as well, for example, a joystick, and other similar devices. As illustrated the selection of the portion by the mouse may be presented to the user by means of a pointer, for example an arrow pointer 504, on the UI 400. In some embodiments, the mouse 502 may be configured to select options and/or multiple portions as well on the user interface 400.

In another example embodiment, FIG. 5B illustrates selection of the portion and/or options by means of a touch screen interface associated with the UI 400. As illustrated in an example representation in FIG. 5B, a portion for example, the portion 430 may be selected by touching the portion 430 with a finger-tip (for example, a finger-tip 506) of a hand portion (for example, a hand portion 508) of a user displayed on a display screen of the UI 400.

In yet another embodiment, FIG. 5C illustrates selection of the portion and/or options by means of a gaze (represented as 510) of a user 512. For example, as illustrated in FIG. 5C, a user may gaze at a portion displayed on a display screen of a user interface, for example the UI 400. In an embodiment, based on the gaze 510 of the user 512, the portion 430 may be selected for being in motion or retaining as stationary in the animated image. In alternative embodiments, various other portions and/or options may be selected based on the gaze 510 of the user 512. In an embodiment, the apparatus, for example, the apparatus 200 may include sensors and other gaze detecting means for detecting the gaze or retina of the user for performing gaze based selection.

Figure 6:
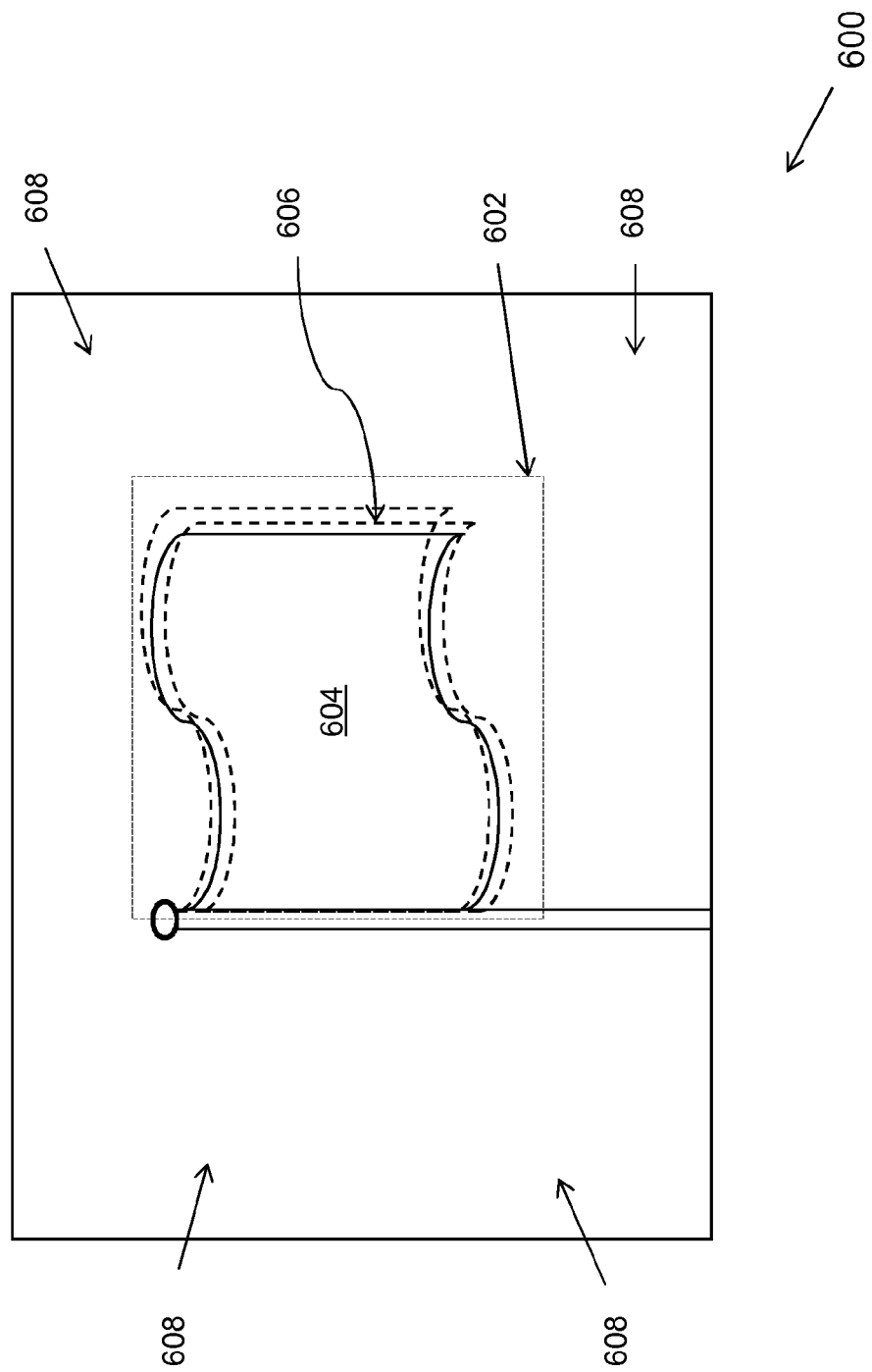
FIG. 6 illustrates a super-resolved animated image in accordance with an example embodiment.

FIG. 6 illustrates a super-resolved animated image 600 in accordance with an example embodiment. The animated image 600 includes a portion 602 including the flag portion 604 performing minor and repeated movement (as depicted by the waving 606 of the flag portion 604). The remaining portions 608 of the animated image 600 are retained as stationary in the animated image 600.

The selection of the portion in multimedia content being displayed on a UI, such as the UI 400, may be performed as explained in FIG. 5A, 5B or 5C. In an embodiment, upon selection of the portion, the plurality of multimedia frames corresponding to the multimedia content may be partitioned into static layers and dynamic layers. An animated image effect may be configured from the dynamic layers and further super-resolved dynamic frame(s) may be generated from the dynamic layers configuring the animated image effect as explained in FIG. 3A. The static layers may be registered and one or more super-resolved static frame(s) may be generated from the static layers as explained in FIG. 3A. In an embodiment, an image frame at super-resolution with the image content related to content included in the multimedia frames may be received. The image frame may be registered based on the static layers and a static frame generated from the registered image frame as explained in FIG. 3B. The static frame(s) may be combined with the dynamic frame(s) and further display of the combined dynamic frame(s) and the static frame(s) in a loop on the UI 400 may be facilitated for generating the animated image, such as the animated image 600, at super-resolution.

Figure 7A:
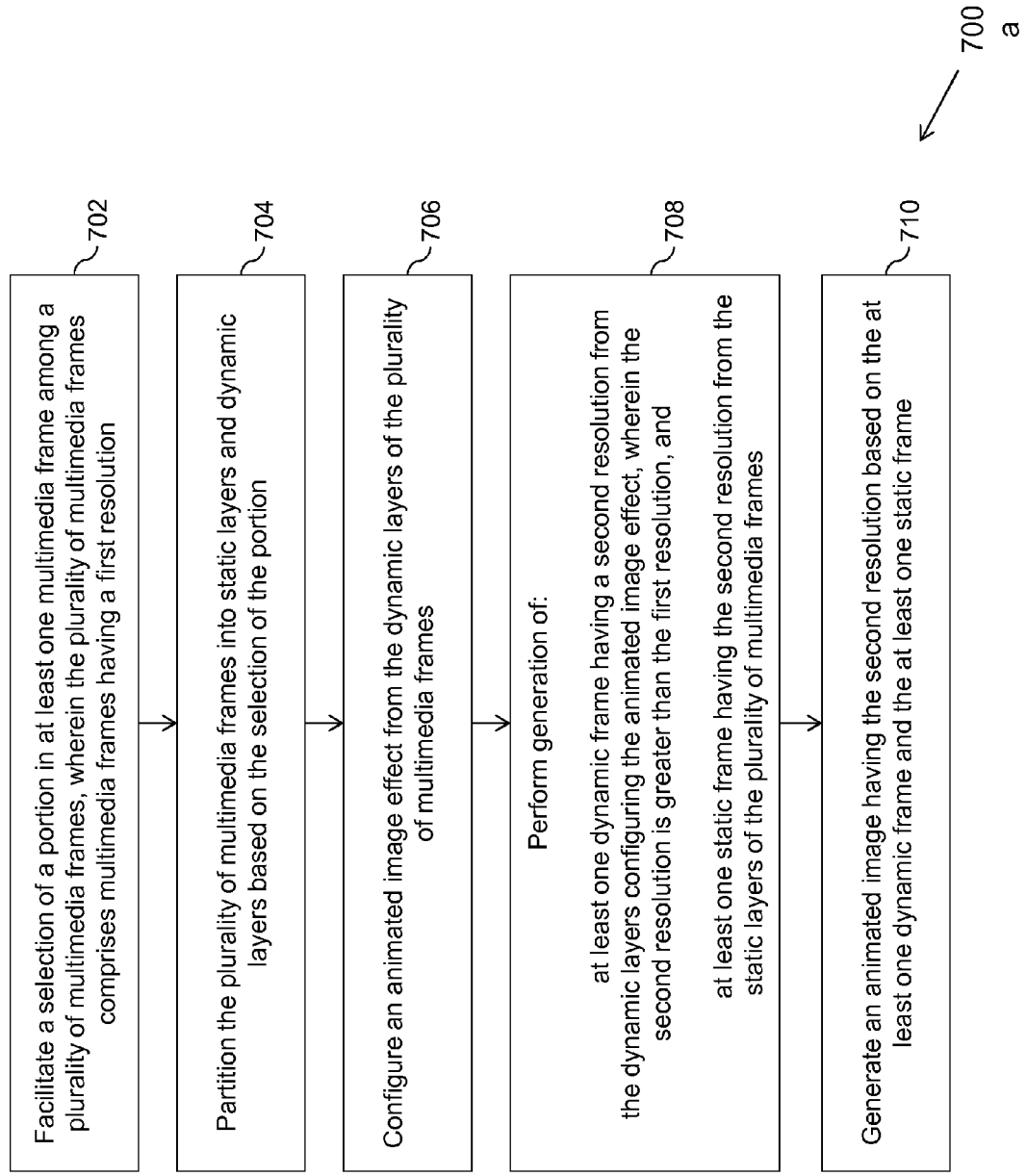
FIG. 7A is a flowchart depicting an example method for generation of animated image having a second resolution from a plurality of multimedia frames, in accordance with an example embodiment.

FIG. 7A is a flowchart depicting an example method 700a for generation of animated image having a second resolution from a plurality of multimedia frames, in accordance with an example embodiment. The method 700a depicted in flow chart may be executed by, for example, the apparatus 200 of FIG. 2. At 702, a selection of a portion in at least one multimedia frame among a plurality of multimedia frames is facilitated. In an embodiment, multimedia content may comprise a plurality of multimedia frames. In an embodiment, the plurality of multimedia frames comprises a sequence of video frames. The sequence of video frames may correspond to a single scene of the multimedia content. In an embodiment, each multimedia frame of the plurality of multimedia frames has a first resolution. In an embodiment, the plurality of multimedia frames may correspond to video content captured by an image sensor, such as the image sensor 208, at the first resolution and stored in a memory (for example, memory 204). In an embodiment, the first resolution may correspond to a low resolution utilized for capturing video content by devices like, for example, a camera, a camcorder and the like. Examples of the first resolution may include, but are not limited to, resolutions of one megapixel or lower, for capturing the multimedia frames of the plurality of multimedia frames.

In an embodiment, the selection of the portion comprises selection of at least one of an object and a region in the at least one multimedia frame for imparting movement in an animation image to be generated from the plurality of multimedia frames. For example, the plurality of multimedia frames may depict a scene where a baby elephant is playing in the wild. One or more multimedia frames may depict a wagging of a tail portion of the baby elephant while playing in the wild. An object in the multimedia frame, for example the baby elephant, or a region in the multimedia frame, for example an area in the multimedia frame depicting wagging of the tail portion may be selected for imparting repeated movement in the animated image. In an embodiment, the selection of the portion comprises selection of at least one of an object and a region in the at least one multimedia frame for retaining as a stationary object/region (with non-selected portions imparted with movement) in the animated image. In an embodiment, the selection of the portion is performed based on a user input. In an embodiment, the user input is facilitated by one of a mouse click, a touch screen command, and a user gaze. In an embodiment, the user may utilize an input interface of a user interface, such as the user interface 206, for providing the selection of one of the object or the region in at least one multimedia frame for imparting movement in the animated image. In an embodiment, the selected at least one object may appear highlighted on the user interface.

At 704, the plurality of multimedia frames are partitioned into static (stationary) layers and dynamic (non-stationary) layers based on the selection of the portion. In an embodiment, upon selection of the portion (region and/or object) in the multimedia frame, the multimedia frame may be split into a static layer and a dynamic layer where a dynamic layer corresponds to content information in the multimedia frame selected to be imparted with movement in the animated image and the static layer corresponds to content information in the multimedia frame selected to be retained as stationary regions and/or objects, based on the selection of the portion. Similar portions (regions and/or objects) may be identified in one or more multimedia frames of the plurality of multimedia frames and similarly partitioned into static and dynamic layers. In an embodiment, segmentation algorithms may be utilized for partitioning the one or more multimedia frames into the static layers and the dynamic layers as explained in FIG. 2. In an embodiment, a texture or color based identification may be performed to identify regions similar to the selected portion and partition the one or more multimedia frames into the static and dynamic layers. In an embodiment, partitioning of the plurality of multimedia frames into the static and dynamic layers may be performed based on estimated areas of motion in addition to the selection of the portion as explained in FIG. 2.

At 706, an animated image effect is configured from the dynamic layers of the plurality of multimedia frames. In an embodiment, the animated image effect may refer to minor and repeated movement of at least one object observed in an image content with the remaining portions are stationary. Configuration of the animated image effect requires creation of a finite duration content that can be played continuously without any visible discontinuities. In an embodiment, for creation of a finite duration content that can be played continuously, a multimedia frame corresponding to a dynamic layer is identified from where a "jump" to a different multimedia frame corresponding to another dynamic layer can be made without noticeable artifacts. Using these jumps, infinite loops may be generated from a finite length multimedia content. In an embodiment, one of a SSD based technique and a video texture based algorithm may be utilized for configuring the animated image effect as explained in FIG. 2.

At 708, at least one dynamic frame having a second resolution from the dynamic layers configuring the animated image effect, and, at least one static frame having the second resolution from the static layers of the plurality of multimedia frames are generated. In an embodiment, the second resolution is configured to be greater than the first resolution. In an embodiment, the second resolution may correspond to a super-resolution (for example, very high resolution) equivalent enhancement in resolution. In an embodiment, the second resolution may correspond to a resolution utilized for capturing still pictures by devices, for example, a camera, a camcorder and the like. Examples of the second resolution may include, but are not limited to, resolutions sufficiently greater than 1 megapixel resolution, such as an 8-megapixel resolution or a 10-megapixel resolution. In an embodiment, one or more dynamic frames having the second resolution may correspond to super-resolved form of the multimedia frames corresponding to the dynamic layers configured with the animated image effect. The super-resolved form of the multimedia frames may be generated by techniques, for example using super-resolution techniques that enhance a resolution of the imaging system. In an embodiment, generation of the one or more dynamic frame(s) from the dynamic layers is performed based on multi-frame based super-resolution. In the multi-frame based super-resolution, multiple frames of the similar frames are utilized to achieve a higher resolution for enhancing the resolution of the multimedia frames. In an embodiment, the generation of the one or more static frame(s) having the second resolution from the static layers of the plurality of multimedia frames is performed based on registration based super-resolution as explained in FIG. 2.

At 710, an animated image having the second resolution is generated based on the at least one dynamic frame and the at least one static frame. In an embodiment, the at least one dynamic frame and the at least one static frame are combined prior to generation of the animated image and a display of the combined at least one dynamic frame and the at least one static frame is facilitated in a loop on a user interface for generating the animated image. In an embodiment, the animated image is displayed on the user interface 206. The display of the animated image on the user interface is explained in FIG. 6. As explained above, the dynamic frame(s) having the second resolution are generated from the dynamic layers configured with the animated image effect, and, the static frame(s) having the second resolution are generated from the static layers. Combining the dynamic frames (configured with the animated image effect on account of the configuration from the dynamic layers) and the static frames, each having the second resolution, generates the animated image having the second resolution. In an embodiment, image blending techniques may be utilized for combining the dynamic frames and the static frame(s). The image blending techniques may involve cross fading or morphing across transitions. In an embodiment, the static and the dynamic frames before and after the transition may be blended together with standard cross fading.

In an embodiment, the dynamic frames induced with the animated image effect may already include an infinite looping of the content corresponding to the dynamic layers. A static frame having the second resolution may be included in the loop such that the loop now includes static frame and the dynamic frames. The inclusion of the static frame in the loop of dynamic frames the may be performed in a manner wherein only the static portions of the dynamic frames are superimposed by the static frame whereas the dynamic portions of the dynamic frames include the animated image effect.

In an embodiment, a registration of the static layers of the plurality of multimedia frames is performed prior to generation of the one or more static frame(s) from the static layers. In an embodiment, registration may refer to process wherein object motion may be separated from motion of media capture medium and all background pixels may be made static in a common multimedia frame. In an embodiment, the registration of the stationary sections may be performed to align similar content across the static layers and remove jitter introduced either on account of movement of media capture medium (e.g., from being handheld) or account of transient environmental conditions, such as high wind conditions, during the capture of the multimedia content. Two-dimensional (2D) and three-dimensional (3D) multimedia stabilization algorithms may be employed for performing the registration as explained in FIG. 2. Another example method 700b for generation of animated image having a second resolution from a plurality of multimedia frames is explained in FIG. 7B.

FIG. 7B is a flowchart depicting another example method 700b for generation of animated image having a second resolution from a plurality of multimedia frames, in accordance with an example embodiment. The method depicted in flow chart may be executed by, for example, the apparatus 200 of FIG. 2.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 700b are described with help of apparatus 200. However, the operations of the method can be described and/or practiced by using any other apparatus.

In an embodiment, the plurality of multimedia frames corresponds to a multimedia content. In an embodiment, the multimedia content is a video recording or a video shot in a burst mode, for example, for about 3-4 seconds. Examples of the multimedia content may include a video presentation of a television program or a video shot, a short movie shot by a multimedia capturing device, and the like. In an embodiment, the multimedia content may be captured by a multimedia capturing device, such as, the device 100. Examples of the multimedia capturing device may include, but are not limited to, a camera, a mobile phone having multimedia capturing functionalities, and the like. In an embodiment, the multimedia content may be captured by using 3-D cameras, 2-D cameras, and the like.

At 712, a selection of a portion in at least one multimedia frame among a plurality of multimedia frames is facilitated. The selection of the portion may be performed as explained in FIG. 7A. At 714, the plurality of multimedia frames are partitioned into static (stationary) layers and dynamic (non-stationary) layers based on the selection of the portion. At 716, an animated image effect is configured from the dynamic layers of the plurality of multimedia frames. The partitioning of the plurality of multimedia frames into static layers and dynamic layers and the configuration of the animated image effect may be performed as explained in FIG. 7A.

At 718, receiving of an image frame having the second resolution is facilitated. In an embodiment, the image frame comprises an image frame content related to content associated with the plurality of multimedia frames, for example including content corresponding to a same scene as that included in the plurality of multimedia frames. In an embodiment, receiving the image frame, for example a still image, may be facilitated by utilizing an image sensor, such as the image sensor 208, for capturing the image frame. In an embodiment, the image frame may be captured during the capture of the multimedia content corresponding to the plurality of multimedia frames. In an embodiment, the image frame may be stored in a memory, such as the memory 204, and its receipt from the memory facilitated by user selection, for example using a mouse click or a touch screen command.

In an embodiment, the second resolution is configured to be greater than the first resolution. In an embodiment, the second resolution may correspond to super-resolution (for example, very high resolution, such as a resolution sufficiently greater than a one megapixel resolution like an 8-megapixel resolution or a 10-megapixel resolution) equivalent enhancement in resolution. In an embodiment, the second resolution may correspond to a resolution utilized for capturing still pictures by devices, for example, a camera, a camcorder and the like.

In an embodiment, the image frame may be registered based on a multimedia frame, for example a sample multimedia frame, of the plurality of multimedia frames. A comparison may be performed between the static layers of the plurality of multimedia frames and the registered image frame. Based on the comparison, static regions in the registered image frame matching the static layers may be selected for generation of the static frame.

At 720, generation of at least one dynamic frame having the second resolution from the dynamic layers configuring the animated image effect, and, generation of at least one static frame having the second resolution based on the registered image frame is performed. In an embodiment, one or more dynamic frames having the second resolution may correspond to a super-resolved form of the multimedia frames corresponding to the dynamic layers configured with the animated image effect. The super-resolved form of the multimedia frames may be generated by techniques, for example using super-resolution techniques that enhance a resolution of the imaging system. In an embodiment, generation of the at least one dynamic frame from the dynamic layers is performed based on multi-frame based super-resolution. In the multi-frame based super-resolution, multiple frames of the similar frames are utilized to achieve a higher resolution for enhancing the resolution of the multimedia frames.

In an embodiment, the generated static frame(s) from the static regions in the registered image has a second resolution (higher resolution) on account of the received image frame having the second resolution. The generation of the static frame(s) from the static layers may be performed as explained above. In an embodiment, the generated static frame from the static regions in the registered image has a second resolution (higher resolution) on account of the received image frame having the resolution.

At 722, at least one dynamic frame and the at least one static frame are combined. In an embodiment, image blending techniques may be utilized for combining the dynamic frames and the static frame(s) as explained in FIG. 2. At 724, a display of the combined at least one dynamic frame and the at least one static frame in a loop on a user interface. In an embodiment, the animated image is displayed on the user interface 206 for generating the animated image. The display of the animated image on the user interface may be performed as depicted in FIG. 6.

In an example embodiment, a processing means may be configured to perform some or all of: facilitating a selection of a portion in at least one multimedia frame among a plurality of multimedia frames, wherein the plurality of multimedia frames comprises multimedia frames having a first resolution; partitioning the plurality of multimedia frames into static layers and dynamic layers based on the selection of the portion; configuring an animated image effect from the dynamic layers of the plurality of multimedia frames; performing generation of: at least one dynamic frame having a second resolution from the dynamic layers configuring the animated image effect, wherein the second resolution is greater than the first resolution, and at least one static frame having the second resolution from the static layers of the plurality of multimedia frames; and generating an animated image having the second resolution based on the at least one dynamic frame and the at least one static frame. An example of the processing means may include the processor 202, which may be an example of the controller 108.

In an example embodiment, a processing means may be configured to perform some or all of: means for facilitating a selection of a portion in at least one multimedia frame among a plurality of multimedia frames, wherein the plurality of multimedia frames comprises multimedia frames having a first resolution; means for partitioning the plurality of multimedia frames into static layers and dynamic layers based on the selection of the portion; means for configuring an animated image effect from the dynamic layers of the plurality of multimedia frames; means for facilitating receiving of an image frame having a second resolution, wherein the image frame comprises an image frame content related to content associated with the plurality of multimedia frames and wherein the second resolution is greater than the first resolution; means for performing generation of: at least one dynamic frame having the second resolution from the dynamic layers configuring the animated image effect, and at least one static frame having the second resolution from the static layers of the plurality of multimedia frames based on the image frame; and means for generating an animated image having the second resolution based on the at least one dynamic frame and the at least one static frame. An example of the processing means may include the processor 202, which may be an example of the controller 108.

To facilitate discussion of the methods 700*b* of FIG. 7B, certain operations are described herein as constituting distinct steps performed in a certain order. Such implementations are exemplary and non-limiting. Certain operation may be grouped together and performed in a single operation, and certain operations can be performed in an order that differs from the order employed in the examples set forth herein.

Moreover, certain operations of the method 700*b* are performed in an automated fashion. These operations involve substantially no interaction with the user. Other operations of the method 700*b* may be performed by in a manual fashion or semi-automatic fashion. These operations involve interaction with the user via one or more user interface presentations (as described in FIGS. 3A, 3B, 4, 5A, 5B, and 5C and 6).

Without in any way limiting the scope, interpretation, or application of the claims appearing below, a technical effect of one or more of the example embodiments disclosed herein is to facilitate generation of animated image having a second resolution (very high resolution, such as for example super-resolution) from the multimedia content. Animated images are short, seamlessly looping animated graphics interchange format images created from multimedia content, such as video content, in which only parts of the image move. Animated image, also referred to as a cinemagraph, capture the dynamics of one particular region in an image for dramatic effect, and provide control over what part of a moment to capture. The animated image enables capturing the dynamics of a moment, for example a waving of a flag or two people shaking hands, in a manner a still image or a video content cannot capture. Irrespective of the resolution at which the multimedia content is captured, animated images at higher resolution (and thereby improved quality) may be generated as explained in FIGS. 7A and 7B. The super-resolved animated image greatly enhances a user viewing experience. In another embodiment, the animated images may be generated at least in parts or under certain circumstances automatically. The method may find application in generating animated panorama images.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present disclosure as defined in the appended claims.

The invention claimed is:

1. A method comprising:
    receiving a selection of a portion in at least one multimedia frame among a plurality of multimedia frames, wherein the plurality of multimedia frames comprises multimedia frames having a first resolution;
    partitioning the plurality of multimedia frames into static layers and dynamic layers based on the selection of the portion;
    configuring an animated image effect from the dynamic layers of the plurality of multimedia frames;
    facilitating receiving of an image frame having a second resolution, by an image sensor, wherein the image frame comprises an image frame content comprising a same scene included in at least one of the plurality of multimedia frames;
    performing generation of:
        at least one dynamic frame having the second resolution from the dynamic layers configuring the animated image effect, wherein the second resolution is greater than the first resolution, and
        at least one static frame having the second resolution from the static layers of the plurality of multimedia frames based on the image frame; and
    generating an animated image having the second resolution based on the at least one of dynamic frame and the at least one static frame.

2. The method as claimed in claim 1, further comprising:
    combining the at least one dynamic frame and the at least one static frame prior to generating the animated image.

3. The method as claimed in claim 2, further comprising:
    facilitating display of the combined at least one dynamic frame and the at least one static frame in a loop on a user interface for generating the animated image.

4. The method as claimed in claim 2, wherein combining the at least one dynamic frame and the at least one static frame includes image blending techniques such as to superimpose the at least one static frame over static regions of the at least one dynamic frame.

5. The method as claimed in claim 1, further comprising:
performing a registration of the image frame based on a multimedia frame of the plurality of multimedia frames;
performing a comparison between the static layers of the plurality of multimedia frames and the registered image frame; and
selecting static regions in the registered image frame matching the static layers based on the comparison for generation of the at least one static frame.

6. The method as claimed in claim 1, wherein the generation of the at least one static frame having the second resolution from the static layers is performed based on registration based super-resolution.

7. The method as claimed in claim 1, wherein the selection of the portion comprises selection of at least one of an object and a region in the at least one multimedia frame for imparting movement in the animation image.

8. An apparatus comprising:
at least one processor; and
at least one memory comprising computer program code, the at least one memory and the computer program code configured to, with the at least one processor, cause the apparatus to at least perform:
receive a selection of a portion in at least one multimedia frame among a plurality of multimedia frames, wherein the plurality of multimedia frames comprises multimedia frames having a first resolution;
partition the plurality of multimedia frames into static layers and dynamic layers based on the selection of the portion;
configure an animated image effect from the dynamic layers of the plurality of multimedia frames;
facilitate receiving of an image frame having the second resolution, wherein the image frame comprises an image frame content comprising a same scene included in at least one of the plurality of multimedia frames;
perform generation of:
at least one dynamic frame having the second resolution from the dynamic layers configuring the animated image effect, wherein the second resolution is greater than the first resolution, and
at least one static frame having the second resolution from the static layers of the plurality of multimedia frames based on the image frame; and
generate an animated image having the second resolution based on the at least one of dynamic frame and the at least one static frame.

9. The apparatus as claimed in claim 8, wherein the apparatus is further caused, at least in part, to:
combine the at least one dynamic frame and the at least one static frame prior to generation of the animated image.

10. The apparatus as claimed in claim 9, wherein the apparatus is further caused, at least in part, to:
facilitate display of the combined at least one dynamic frame and the at least one static frame in a loop on a user interface for generating the animated image.

11. The apparatus as claimed in claim 9, wherein to combine the at least one dynamic frame and the at least one static frame includes image blending techniques such as to superimpose the at least one static frame over static regions of the at least one dynamic frame.

12. The apparatus as claimed in claim 8, wherein the apparatus is further caused, at least in part, to:
perform a registration of the image frame based on a multimedia frame of the plurality of multimedia frames;
perform a comparison between the static layers of the plurality of multimedia frames and the registered image frame; and
select static regions in the registered image frame matching the static layers based on the comparison for generation of the at least one static frame.

13. The apparatus as claimed in claim 8, wherein the generation of the at least one static frame having the second resolution from the static layers is performed based on registration based super-resolution.

14. The apparatus as claimed in claim 8, wherein the selection of the portion comprises selection of at least one of an object and a region in the at least one multimedia frame for imparting movement in the animation image.

15. A computer program product comprising at least one computer-readable storage medium, the computer-readable non-transitory storage medium comprising a set of instructions, which, when executed by one or more processors, cause an apparatus at least to perform:
receive a selection of a portion in at least one multimedia frame among a plurality of multimedia frames, wherein the plurality of multimedia frames comprises multimedia frames having a first resolution;
partition the plurality of multimedia frames into static layers and dynamic layers based on the selection of the portion;
configure an animated image effect from the dynamic layers of the plurality of multimedia frames;
facilitate receiving of an image frame having the second resolution, wherein the image frame comprises an image frame content related to content comprising a same scene included in at least one of the plurality of multimedia frames;
perform generation of:
at least one dynamic frame having the second resolution from the dynamic layers configuring the animated image effect, wherein the second resolution is greater than the first resolution, and
at least one static frame having the second resolution from the static layers of the plurality of multimedia frames based on the image frame; and
generate an animated image having the second resolution based on the at least one of dynamic frame and the at least one static frame.

16. The computer program product as claimed in claim 15, wherein the apparatus is further caused, at least in part, to:
combine the at least one dynamic frame and the at least one static frame prior to generating the animated image.

17. The computer program product as claimed in claim 16, wherein the apparatus is further caused, at least in part, to:
facilitate display of the combined at least one dynamic frame and the at least one static frame in a loop on a user interface for generating the animated image.

18. The computer program product as claimed in claim 16, wherein to combine the at least one dynamic frame and the at least one static frame includes image blending techniques such as to superimpose the at least one static frame over static regions of the at least one dynamic frame.

19. The computer program product as claimed in claim 15, wherein the apparatus is further caused, at least in part, to:
   perform a registration of the image frame based on a multimedia frame of the plurality of multimedia frames;
   perform a comparison between the static layers of the plurality of multimedia frames and the registered image frame; and
   select static regions in the registered image frame matching the static layers based on the comparison for generation of the at least one static frame.

20. The computer program product as claimed in claim 15, wherein the generation of the at least one static frame having the second resolution from the static layers is performed based on registration based super-resolution.

* * * * *